(12) United States Patent
Goergen et al.

(10) Patent No.: US 11,582,048 B2
(45) Date of Patent: Feb. 14, 2023

(54) BI-DIRECTIONAL POWER OVER ETHERNET FOR DIGITAL BUILDING APPLICATIONS

(71) Applicant: CISCO TECHNOLOGY, INC., San Jose, CA (US)

(72) Inventors: Joel Richard Goergen, Soulsbyville, CA (US); Chad M. Jones, Doylestown, OH (US); Charles Lacey Compton, III, Palo Alto, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 109 days.

(21) Appl. No.: 17/068,115

(22) Filed: Oct. 12, 2020

(65) Prior Publication Data

US 2022/0021548 A1  Jan. 20, 2022

Related U.S. Application Data

(60) Provisional application No. 63/053,500, filed on Jul. 17, 2020, provisional application No. 63/070,110, filed on Aug. 25, 2020.

(51) Int. Cl.
*H04L 12/10* (2006.01)
*G06F 1/26* (2006.01)
(Continued)

(52) U.S. Cl.
CPC ............. *H04L 12/10* (2013.01); *G06F 1/266* (2013.01); *G06F 1/28* (2013.01); *G06F 1/30* (2013.01);
(Continued)

(58) Field of Classification Search
CPC ... H04L 12/10; H04L 12/40045; G06F 1/266; G06F 1/28; G06F 1/30; G06F 1/3212
See application file for complete search history.

(56) References Cited

U.S. PATENT DOCUMENTS 7,420,355 B2  9/2008  Liu
7,566,987 B2  7/2009  Black et al.
(Continued)

FOREIGN PATENT DOCUMENTS

CN   1209880 C    7/2005
CN   104793544 A  7/2015
(Continued)

OTHER PUBLICATIONS

International Search Report and Written Opinion in counterpart International Application No. PCT/US2021/040524, dated Sep. 29, 2021, 17 pages.

(Continued)

*Primary Examiner* — Aurel Prifti

(57) ABSTRACT

In one or more embodiments, a system includes a plurality of network devices comprising a plurality of ports, a power bus connecting the network devices, wherein power is shared between the network devices over the power bus, and a controller for identifying available power and allocating power to the ports. The ports include a plurality of PSE (Power Sourcing Equipment) PoE (Power over Ethernet) ports each operable to transmit power to a device connected to one of the PSE PoE ports, a plurality of PD (Powered Device) PoE ports each operable to receive power from a device connected to one of the PD PoE ports, and a plurality of bi-directional PoE ports each configurable to operate as a PSE PoE port to transmit power to a device connected to one of the bi-directional PoE ports or as a PD PoE port to receive power from the connected device.

32 Claims, 20 Drawing Sheets

(51) Int. Cl.
  *G06F 1/30* (2006.01)
  *G06F 1/3212* (2019.01)
  *G06F 1/28* (2006.01)
  *H04L 12/40* (2006.01)

(52) U.S. Cl.
  CPC ...... *G06F 1/3212* (2013.01); *H04L 12/40045* (2013.01)

(56) References Cited

U.S. PATENT DOCUMENTS

| | | | |
|---|---|---|---|
| 8,310,089 B2 | 11/2012 | Schindler | |
| 8,638,008 B2 | 1/2014 | Baldwin et al. | |
| 8,768,528 B2 | 7/2014 | Millar et al. | |
| 8,781,637 B2 | 7/2014 | Eaves | |
| 9,256,263 B1* | 2/2016 | Narayanan | G06F 1/3243 |
| 9,419,436 B2 | 8/2016 | Eaves | |
| 9,900,164 B2* | 2/2018 | Spiel | H04L 12/10 |
| 10,025,362 B2* | 7/2018 | Ferentz | H04L 12/40045 |
| 10,263,526 B2 | 4/2019 | Sandusky et al. | |
| 10,281,513 B1 | 5/2019 | Goergen | |
| 10,407,995 B2 | 9/2019 | Moeny | |
| 10,541,543 B2 | 1/2020 | Eaves | |
| 10,541,758 B2 | 1/2020 | Goergen | |
| 10,564,687 B2* | 2/2020 | Vincent | G06F 1/3203 |
| 10,631,443 B2 | 4/2020 | Byers | |
| 10,672,537 B2 | 6/2020 | Goergen | |
| 10,680,836 B1 | 6/2020 | Sironi | |
| 10,732,688 B2 | 8/2020 | Goergen | |
| 10,735,105 B2 | 8/2020 | Goergen et al. | |
| 10,763,749 B2 | 9/2020 | Arduini | |
| 10,790,997 B2 | 9/2020 | Jones | |
| 10,809,134 B2 | 10/2020 | Bullock | |
| 10,958,471 B2 | 3/2021 | Goergen | |
| 2005/0136989 A1* | 6/2005 | Dove | G06F 1/266 455/572 |
| 2006/0053324 A1* | 3/2006 | Giat | H04L 12/10 713/300 |
| 2008/0077811 A1* | 3/2008 | Dove | G06F 1/266 713/300 |
| 2008/0133945 A1 | 6/2008 | Biederman et al. | |
| 2008/0198635 A1 | 8/2008 | Hussain | |
| 2008/0263373 A1* | 10/2008 | Meier | G06F 9/3891 713/300 |
| 2009/0210725 A1* | 8/2009 | Kim | H04L 12/10 713/300 |
| 2011/0258465 A1* | 10/2011 | Diab | H04L 12/10 713/300 |
| 2011/0266867 A1* | 11/2011 | Schindler | G06F 1/266 307/24 |
| 2012/0173905 A1 | 7/2012 | Diab et al. | |
| 2013/0262887 A1 | 10/2013 | Biederman | |
| 2013/0339760 A1* | 12/2013 | Zimmerman | H04L 12/10 713/300 |
| 2014/0021903 A1* | 1/2014 | Seiling | H02J 7/0042 52/173.3 |
| 2014/0245031 A1* | 8/2014 | Hamdi | G06F 1/28 713/300 |
| 2015/0121113 A1* | 4/2015 | Ramamurthy | G06F 1/30 713/340 |
| 2016/0064938 A1* | 3/2016 | Balasubramanian | H04L 12/10 307/11 |
| 2016/0294568 A1 | 10/2016 | Chawgo et al. | |
| 2016/0363980 A1* | 12/2016 | Spiel | G06F 1/3206 |
| 2017/0237580 A1* | 8/2017 | Radermacher | H04L 12/2838 307/38 |
| 2018/0098201 A1 | 4/2018 | Torello | |
| 2018/0123360 A1 | 5/2018 | Eaves | |
| 2018/0313886 A1 | 11/2018 | Mlyniec | |
| 2019/0245155 A1* | 8/2019 | Heath | H01L 51/0076 |
| 2019/0272011 A1 | 9/2019 | Goergen | |
| 2019/0280895 A1* | 9/2019 | Mather | H04L 43/10 |
| 2019/0363493 A1 | 11/2019 | Sironi | |
| 2020/0067720 A1 | 2/2020 | Hartnett | |
| 2020/0233472 A1 | 7/2020 | Jones | |
| 2020/0235949 A1 | 7/2020 | Jones | |
| 2020/0295955 A1 | 9/2020 | O'Brien | |
| 2020/0409347 A1* | 12/2020 | Berry | G01R 31/08 |

FOREIGN PATENT DOCUMENTS

| | | |
|---|---|---|
| CN | 204836199 U | 12/2015 |
| CN | 104081237 B | 10/2016 |
| CN | 104412541 B | 5/2019 |
| WO | 2016020122 A1 | 2/2016 |

OTHER PUBLICATIONS

Petition for Post Grant Review of U.S. Pat. No. 10,735,105 [Public], filed Feb. 16, 2021, PGR 2021-00055.

Petition for Post Grant Review of U.S. Pat. No. 10,735,105 [Public], filed Feb. 16, 2021, PGR 2021-00056.

Eaves, S. S., "Network Remote Powering Using Packet Energy Transfer, Proceedings of IEEE International Conference on Telecommunications Energy (INTELEC) 2012, Scottsdale, AZ, Sep. 30-Oct. 4, 2012 (IEEE 2012) ("EavesIEEE').

Edelstein S., Updated 2016 Tesla Model S also gets new 75-kWh battery option, (Jun. 19, 2016), archived Jun. 19, 2016 by Internet Archive Wayback machine at https://web.archive.org/web/20160619001148/https://www.greencarreports.com/news/1103 782_updated-2016-tesla-model-s-also-gets-new-7 5-kwh-battery-option ("Edelstein").

NFPA 70 National Electrical Code, 2017 Edition (NEC').

International Standard IEC 62368-1 Edition 2.0 (2014), ISBN 978-2-8322-1405-3 ("IEC-62368").

International Standard IEC/TS 60479-1 Edition 4.0 (2005), ISBN 2-8318-8096-3 ("IEC-60479").

International Standard IEC 60950-1 Edition 2.2 (2013), ISBN 978-2-8322-0820-5 ("IEC-60950").

International Standard IEC 60947-1 Edition 5.0 (2014), ISBN 978-2-8322-1798-6 ("IEC-60947").

Tanenbaum, A. S., Computer Networks, Third Edition (1996) ("Tanenbaum").

Stallings, W., Data and Computer Communications, Fourth Edition ( 1994) ("Stallings").

Alexander, C. K., Fundamentals of Electric Circuits, Indian Edition (2013) ("Alexander").

Hall, S. H., High-Speed Digital System Design, A Handbook of Interconnect Theory and Design Practices (2000) ("Hall").

Sedra, A. S., Microelectronic Circuits, Seventh Edition (2014) ("Sedra").

Lathi, B. P., Modern Digital and Analog Communication Systems, Fourth Edition (2009) ("Lathi").

Understanding 802.3at PoE Plus Standard Increases Available Power (Jun. 2011) ("Microsemi").

* cited by examiner

BI-DIRECTIONAL POWER OVER ETHERNET FOR DIGITAL BUILDING APPLICATIONS

STATEMENT OF RELATED APPLICATIONS

The present application claims priority from U.S. Provisional Application Nos. 63/053,500 entitled BI-DIRECTIONAL POWER OVER ETHERNET, filed on Jul. 17, 2020 and 63/070,110 entitled BI-DIRECTIONAL POWER OVER ETHERNET FOR INTEGRATED DIGITAL BUILDING, filed on Aug. 25, 2020. The contents of these provisional applications are incorporated herein by reference in their entirety.

TECHNICAL FIELD

The present disclosure relates generally to Power over Ethernet (PoE), and more particularly, to bi-directional PoE.

BACKGROUND

In applications such as digital building system applications, there is a need for PoE devices to connect to power devices such as solar and battery devices, which require additional capabilities of PoE systems that are not currently provided by conventional PoE systems.

BRIEF DESCRIPTION OF THE FIGURES

Corresponding reference characters indicate corresponding parts throughout the several views of the drawings.

DESCRIPTION OF EXAMPLE EMBODIMENTS

Overview

Figure 1:
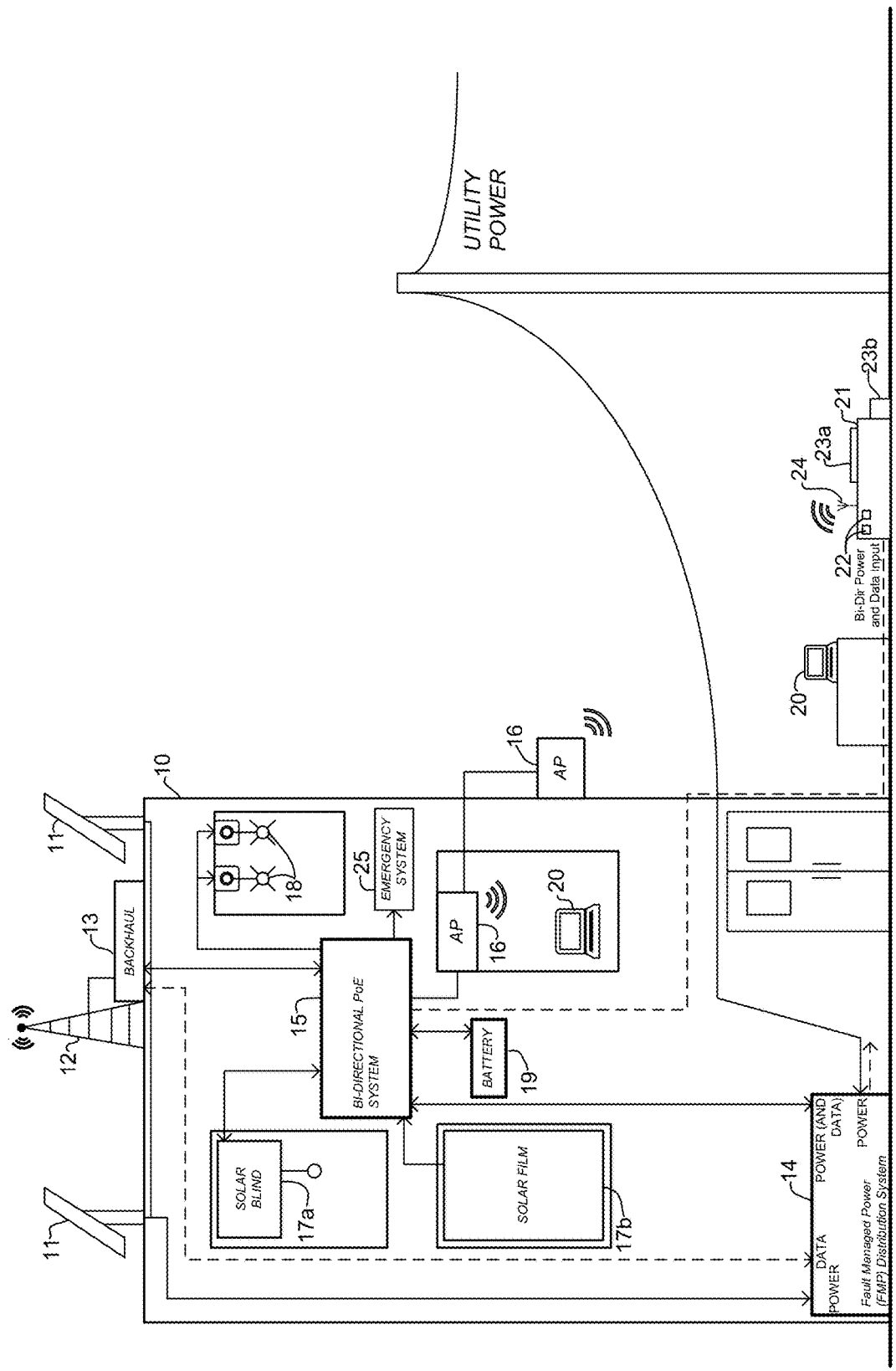
FIG. 1 illustrates an example of an integrated digital building system in which the embodiments described herein may be implemented, in accordance with one embodiment.

In one embodiment, a system generally comprises a plurality of network devices comprising a plurality of ports, a power bus connecting the network devices, wherein power is shared between the network devices over the power bus, and a controller for identifying available power and allocating power to the ports. The ports include a plurality of PSE (Power Sourcing Equipment) PoE (Power over Ethernet) ports, PD (Powered Device) PoE ports, and bi-directional PoE ports. The PSE PoE port is operable to transmit power to a device connected to the PSE PoE port. The PD PoE port is operable to receive power from a device connected to the PD PoE port. The bi-directional PoE port is configurable to operate as a PSE PoE port to transmit power to a device connected to the bi-directional PoE port or as a PD PoE port to receive power from the connected device.

In one embodiment, an apparatus generally comprises a plurality of bi-directional PoE ports each configurable to operate as a PSE PoE port to transmit power to a device connected to one of the bi-directional PoE ports or as a PD PoE port to receive power from the connected device, a power supply unit, and a fault managed power module for receiving fault managed power on an Ethernet cable, converting the fault managed power to a power supply input power, and transmitting the power supply input power to the power supply unit.

In one embodiment, a method generally comprises identifying available power from a plurality of power sources comprising a utility power source, a solar power source, and a battery power source, identifying active ports in a bi-directional Power over Ethernet (PoE) system, and allocating power from one or more of the power sources to power the active ports.

In yet another embodiment, a system generally comprises a plurality of energy resource devices, a network device comprising a plurality of PD PoE ports operable to receive power from the energy resource devices connected to the PD PoE ports, and a power bus for receiving power from the network device and transmitting power to at least one other network device comprising a plurality of PSE (Power Sourcing Equipment) PoE ports for transmitting power to powered devices.

Further understanding of the features and advantages of the embodiments described herein may be realized by reference to the remaining portions of the specification and the attached drawings.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

New energy systems allow for low cost solar energy to power buildings and may also incorporate battery power distribution systems. Power over Ethernet (PoE) allows for communications and power distribution to electrically powered components and systems throughout the building, including for example, lights, blinds, emergency systems, building operational systems, and other powered components and systems. Conventional PoE systems provide point-to-point PSE (Power Sourcing Equipment) to PD (Powered Device) power distribution systems. In conventional systems, the PSE powering system behind a network port only operates in one direction, thus limiting capabilities within the power distributions system.

Embodiments described herein provide a bi-directional PoE system that allows for PoE PSE to PD port negotiation or PoE PD to PSE port negotiation. The bi-directional PoE system may be used, for example, to allow PoE devices to connect to solar and battery devices while also providing communications on the same wires. Bi-directional PoE allows a PSE to negotiate to a PD or for a PD to negotiate to a PSE to source power to an attached network device and share power with other applications.

One or more embodiments described herein provide a system, apparatus, method, or logic implementing bi-directional PoE to support multiple ports of received power or sourced power. The system may be deployed, for example, in a digital building to support integrated digital building applications. The bi-directional PoE system provides a power delivery system in which one or more ports may identify a power direction (transmitting or receiving) based on a state of power flow. Each port may independently operate as a PSE to deliver (transmit) power or as a PD to receive power. This allows for any combination of ports transmitting power or receiving power. As described in detail below, the bi-directional PoE system may include a bi-directional PoE circuit for each port to be used as a PSE or PD. One or more embodiments allow devices such as solar devices or other power sourcing devices to contribute to a PoE power load in an environmentally responsive manner. One or more embodiments provide a bi-directional PoE system that maintains compatibility with existing IEEE (Institute of Electrical and Electronics Engineer) 802.3 standards.

Referring now to the drawings, and first to FIG. 1, an example of an advanced integrated digital building system in which the embodiments described herein may be implemented is shown, in accordance with one embodiment. In this example, a building 10 includes solar panels 11 in a solar roof system. The building 10 may also include energy resources other than solar, such as a wind power system, for example. The solar panels 11 are in communication with a power distribution system 14. The power distribution system 14 may receive utility power, as shown in FIG. 1. The reusable energy sources may reduce the need for utility power and eliminate the need for a generator or central battery system. In one or more embodiments, power from reusable power sources may also be pushed back into the utility power. The power distribution system 14 is operable to transmit power (or transmit and receive bi-directional power) to a bi-directional PoE system 15.

The building 10 may be configured with one or more antennas 12 (e.g., 5G antenna) coupled to a backhaul system 13 (e.g., defining a backhaul antenna). In one or more embodiments, the power distribution system 14 is in communication with the backhaul system 13 for distributing data along with the power to the bi-directional PoE system 15. The data may also be transmitted directly between the backhaul system 13 and the bi-directional PoE system. It is to be understood that data may also be received by means other than the antenna 12.

In one or more embodiments, the power distribution system 14 comprises an FMP (Fault Managed Power)/ESP (Extended Safe Power) distribution system that is configured to transmit and receive power or power and data. In one or more embodiments, the power distribution system 14 may be configured for Power over Ethernet (PoE) (e.g., conventional PoE or PoE+ at a power level <100 watts (W), at a voltage level <57 volts (V), according to IEEE 802.3af, IEEE 802.3at, or IEEE 802.3bt), Power over Fiber (PoF), advanced power over data, FMP, or any other power over communications system in accordance with current or future standards, which may be used to pass electrical power along with data to allow a single cable to provide both data connectivity and electrical power to network devices such as switches, routers, wireless access points, and many other network devices.

The term "Fault Managed Power" (FMP) (also referred to as Extended Safe Power (ESP)) as used herein refers to high power (e.g., >100 W), high voltage (e.g., ≥56V) operation with pulse power delivered on one or more wires or wire pairs. In one or more embodiments, FMP includes fault detection (e.g., fault detection at initialization and between high voltage pulses) and pulse synchronization between power sourcing equipment (PSE) and a powered device (PD). The power may be transmitted with communications (e.g., bi-directional communications) or without communications.

The term "pulse power" (also referred to as "pulsed power") as used herein refers to power that is delivered in a sequence of pulses (alternating low direct current voltage state and high direct current voltage state) in which the voltage varies between a very small voltage (e.g., close to 0V, 3V) during a pulse-off interval and a larger voltage (e.g., >12V, >24V) during a pulse-on interval. In one or more embodiments, the FMP (or ESP) provides high power (e.g., ≥100 W) at a high voltage (e.g., ≥56V). High voltage pulse power (e.g., ≥56 VDC, ≥60 VDC, ≥300 VDC, ~108 VDC, ~380 VDC) may be transmitted from power sourcing equipment to a powered device for use in powering the powered device, as described, for example, in U.S. patent application Ser. No. 16/671,508 ("Initialization and Synchronization for Pulse Power in a Network System"), filed Nov. 1, 2019, which is incorporated herein by reference in its entirety. Pulse power transmission may be through cables, transmission lines, bus bars, backplanes, PCBs (Printed Circuit Boards), and power distribution systems, for example. It is to be understood that the power and voltage levels described herein are only examples and other levels may be used.

In one or more embodiments, FMP may comprise pulse power transmitted in multiple phases in a multi-phase pulse power system with pulses offset from one another between wires or wire pairs to provide continuous power. One or more embodiments may, for example, use multi-phase pulse power to achieve less loss, with continuous uninterrupted power with overlapping phase pulses to a powered device, as described in U.S. patent application Ser. No. 16/380,954 ("Multiple Phase Pulse Power in a Network Communications System"), filed Apr. 10, 2019, which is incorporated herein by reference in its entirety. In one or more embodiments, FMP may refer to a combination of ESP (single-phase or multi-phase DC pulse power) and PoE or a power system operable to switch between ESP and PoE.

The power distribution system 14 may comprise, for example, a router, switch, or other network device operable to receive power (e.g., utility power, solar power, battery power, wind power) and data (e.g., Ethernet) and transmit power and data to the bi-directional PoE system 15. Integration and control of power from the different power sources may be performed, for example, as described in U.S. patent application Ser. No. 16/746,500 ("Method and System for Integration and Control of Power for Consumer Power Circuits"), filed Jan. 17, 2020, which is incorporated herein by reference in its entirety. As previously described, the power and data may be transmitted as PoE, FMP, ESP, or transmitted using any other suitable power over communications system. In one or more embodiments, the power distribution system 14 transmits bi-directional power and data to the bi-directional PoE system 15. In one or more embodiments, the power distribution system 14 only receives and transmits power (or bi-directional power). As described in detail below, the bi-directional PoE system 15 may comprise one or more switches, routers, or other network devices comprising a plurality of ports with a bi-directional PoE circuit for each port to be operated as a PSE or PD. The bi-directional PoE system may also include one or more network devices with one or more FMP ports or one or more conventional network devices with only PSE or PD ports.

As shown in FIG. 1, the bi-directional PoE system is connected to any number of powered devices, power sourcing equipment, and bi-directional PoE devices that may operate as PDs or PSEs. In the example shown in FIG. 1, the digital building 10 includes a plurality of APs (Access Points) 16 mounted within the building or external to the building, solar operated blinds 17a, solar films 17b (with photovoltaic cells), LED (Light Emitting Diode) lighting 18, and one or more rechargeable batteries 19. The bi-directional PoE system 15 may also be operable to power one or more emergency systems 25. The APs 16 may be in communication with any number of network devices 20 (e.g., computer, laptop, tablet, mobile device, phone, and the like) via Wi-Fi.

In the example shown in FIG. 1, the building includes an outside break area with a local charging station 21 (network device) operable to provide local Wi-Fi and charging to a defined area. The charging station 21 may be a mini bi-directional PSE/PD device powered with bi-directional PoE from the bi-directional PoE system 15 or powered with FMP from the power distribution system 14. The charging station 21 may be configured for use in small spaces such as a break area (inside or outside) covering only a designated location.

The charging station 21 may include, for example, one or more USB (Universal Serial Bus) ports 22, a solar panel 23a, local battery 23b, and antenna 24. The charging station 21 may combine, for example, light versions of PoE, Wi-Fi, hardwire, charging, battery capability, solar charging, or any combination thereof. The charging station 21 may also be a stand-alone system with the solar panel 23a and battery 23b providing power to the charging station 21 and no bi-directional power input, to support a small number of wireless devices (e.g., one-three laptops) for a specified period of time (e.g., two hours).

It is to be understood that the digital building and integrated applications shown in FIG. 1 is only an example, and the system may include any number or type of building applications (e.g., light and temperature control, video surveillance, emergency systems), digital network architecture (switching, routing, security), endpoint devices (e.g., sensors (lighting, environmental), IoT (Internet of Things) devices, access points, LED lighting, HVAC (Heating, Ventilation, and Air Conditioning) controller, security devices, video cameras, access control systems, conferencing systems, fire and safety systems), or power sources (e.g., solar, wind, battery, utility).

Figure 2:
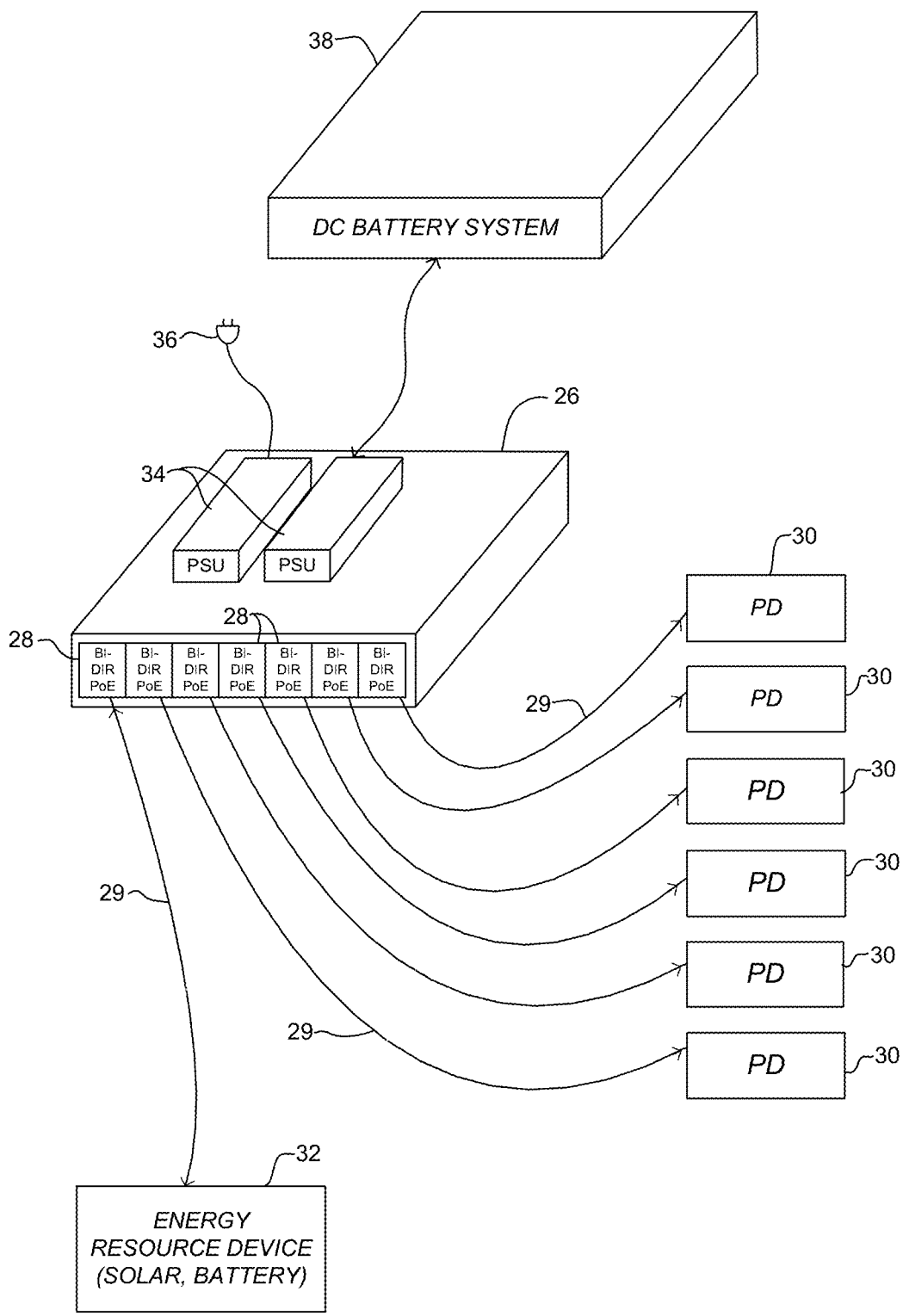
FIG. 2 illustrates a bi-directional PoE system in accordance with one embodiment.

FIG. 2 illustrates a bi-directional PoE system, in accordance with one embodiment. A bi-directional PoE network device (e.g., switch) 26 comprises a plurality of bi-directional PoE ports 28. The ports 28 are connected to a plurality of endpoint devices 30, 32 via Ethernet cables 29. The network device 26 may be configured to transmit PoE to any number or type of powered devices 30 (e.g., window blinds, room lighting, television, HVAC controls, mini-bar, charging station, and the like).

One or more of the ports 28 may be coupled to an endpoint device operable as a PD or PSE based on available free power to send back into the bi-directional PoE system. As shown in the example of FIG. 2, the endpoint device comprises an energy resource device 32 (i.e., power source operable to generate power local to the endpoint device and provide the power to circuitry at the endpoint device). The energy resource device (local power source) 32 may include, for example, a rechargeable battery, photovoltaic device (e.g., solar capable blind/window system, solar panel or film), or other renewable power source or utility power source (AC power source). The energy resource device 32 may operate as a PSE or PD based on available free power to send back into the power system. If the energy resource device has excess power available after powering the local circuits in the endpoint device, the energy resource device may also provide the excess power to the network device 26 over Ethernet cable 29. The port 28 switches between operation as a PSE port or PD port based on operating state of the energy resource device 32. As described in detail below, each of the bi-directional ports 28 and one or more ports at the endpoint devices 32 may be configurable as responsive to an enable signal to operate as either a PSE port to source power or as a PD port to receive power. Coordination between role reversal at connected ports is described below with respect to FIGS. 13 and 14.

The network device 26 may include any number of PSUs (Power Supply Units) 34. The PSU 34 may be a removable module (field replaceable, hot-swappable device) that is received in an opening at the rear of the chassis (or other location) and configured to provide power (e.g., 48 VDC, 54 VDC, or other regulated voltage) to the network device 26. One or more of the PSUs 34 may receive utility power or power from an UPS (Uninterruptible Power Source) at a plug 36. As shown in the example of FIG. 2, one of the PSUs 34 is bi-directionally coupled to a battery system (e.g., DC battery system, portable power system, wall mounted power system) 38. The rechargeable battery 38 is operable to source power and be charged by excess system power from the network device 26.

It is to be understood that the switch 26 shown in FIG. 2 is only an example of a device that may be used to implement the embodiments described herein and that other types of devices (e.g., router, switch/router, or other network device) with any number of ports may be used. Also, any number of the ports may be configured for bi-directional PoE (both PD and PSE operation), PD operation, PSE operation, or FMP operation at one or more power levels. For example, the system may be configured as a 90 watt system with bi-directional PoE or a bi-directional 350 watt PoE system and may be powered by an FMP power system with bi-directional FMP, as described below.

Figure 3:
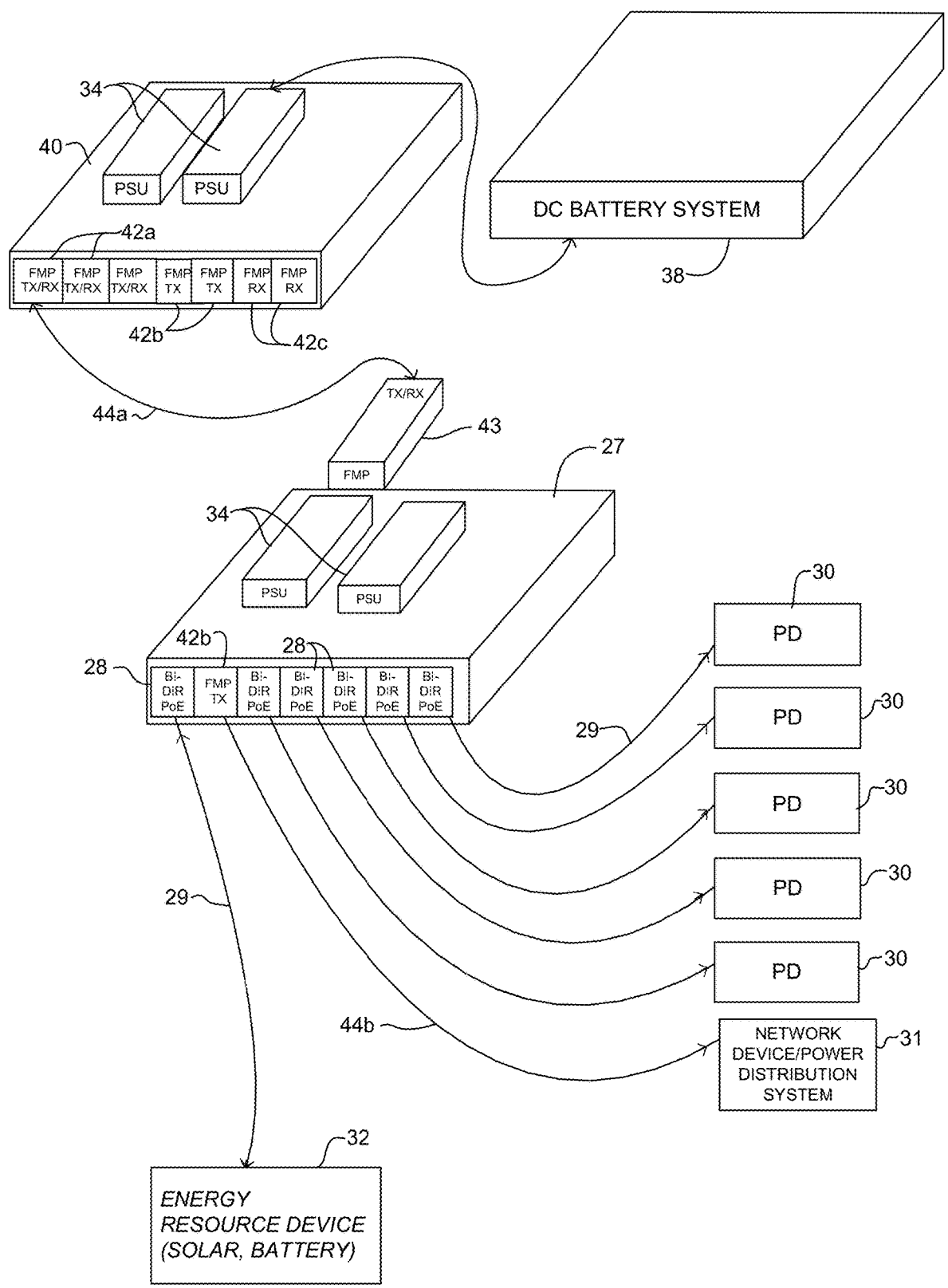
FIG. 3 illustrates another example of the bi-directional PoE system, in accordance with one embodiment.

FIG. 3 illustrates a bi-directional PoE system utilizing FMP (also referred to as FMP/ESP). In one or more embodiments, an apparatus (network device, switch) 27 comprises a plurality of bi-directional PoE ports 28 each configurable to operate as a PSE PoE port to transmit power to a device 32 connected to one of the bi-directional PoE ports or as a PD PoE port to receive power from the connected device, the power supply unit 34, and a fault managed power module 43 for receiving fault managed power on an Ethernet cable 44a, converting the fault managed power to a power supply input power, and transmitting the power supply input power to the power supply unit.

The network device 27 may also comprise one or more FMP ports (e.g., FMP TX 42b as shown in FIG. 3, FMP TX/RX port, FMP RX port). The FMP TX port 42b may, for example, transmit FMP over cable 44b to one or more network devices or power distribution system 31 (e.g., provide power to another network device or powered device). As described below with respect to FIG. 4, the FMP TX port 42b may be used in a bi-directional PoE system with multiple energy resource devices to add excess power back into a utility power source (e.g., through the power distribution system 14 of FIG. 1).

As shown in FIG. 3 an FMP bi-directional device 40 may be interposed between the DC battery system 38 and the bi-directional PoE switch 27 to convert the DC battery power to FMP. The switch 27 may use excess PoE power to push back into the FMP device 40. The battery system 38 includes a bi-directional connection with the FMP device 40 so that it can both source power or be charged by excess system power. In the example shown in FIG. 3, the FMP bi-directional device 40 comprises FMP transmitter/receiver (FMP TX/RX) ports 42a, FMP transmitter (FMP TX) ports 42b, and FMP receiver (FMP RX) ports 42c. It is to be understood that the FMP device 40 may include any number of ports configured as a transmitter/receiver, transmitter, or receiver.

The FMP device 40 has a bi-directional connection (cable 44a) to the FMP module 43 (also referred to as a power receiver, FMP receiver, or power adapter). The fault managed power module 43 is configured to receive fault managed power on the Ethernet cable 44a, convert the fault managed power to a power supply input power, and transmit the PSU input power to the power supply unit 34. The bi-directional PoE switch 27 may comprise one or more PSUs 34 (two shown in FIG. 3) with one or more power adapters 43 aligned for connection with the PSUs (one adapter shown in FIG. 3). The FMP module 43 is operable to convert the FMP to a standard power supply input power (e.g., 240 VAC, 240 VDC, 380 VDC, or other standard PSU input power). The cable 44a may comprise four-pair communications cabling, Single Pair Ethernet (SPE), or any other cable comprising one or more wire pairs. Single-phase or multi-phase pulse power input may be provided to the FMP module 43 on the cable 44a. The FMP module 43 may comprise, for example, a power adapter as described in U.S. patent application Ser. No. 16/912,563 ("Power Adapter for Power Supply Unit"), filed Jun. 25, 2020, which is incorporated herein by reference in its entirety.

Figure 4:
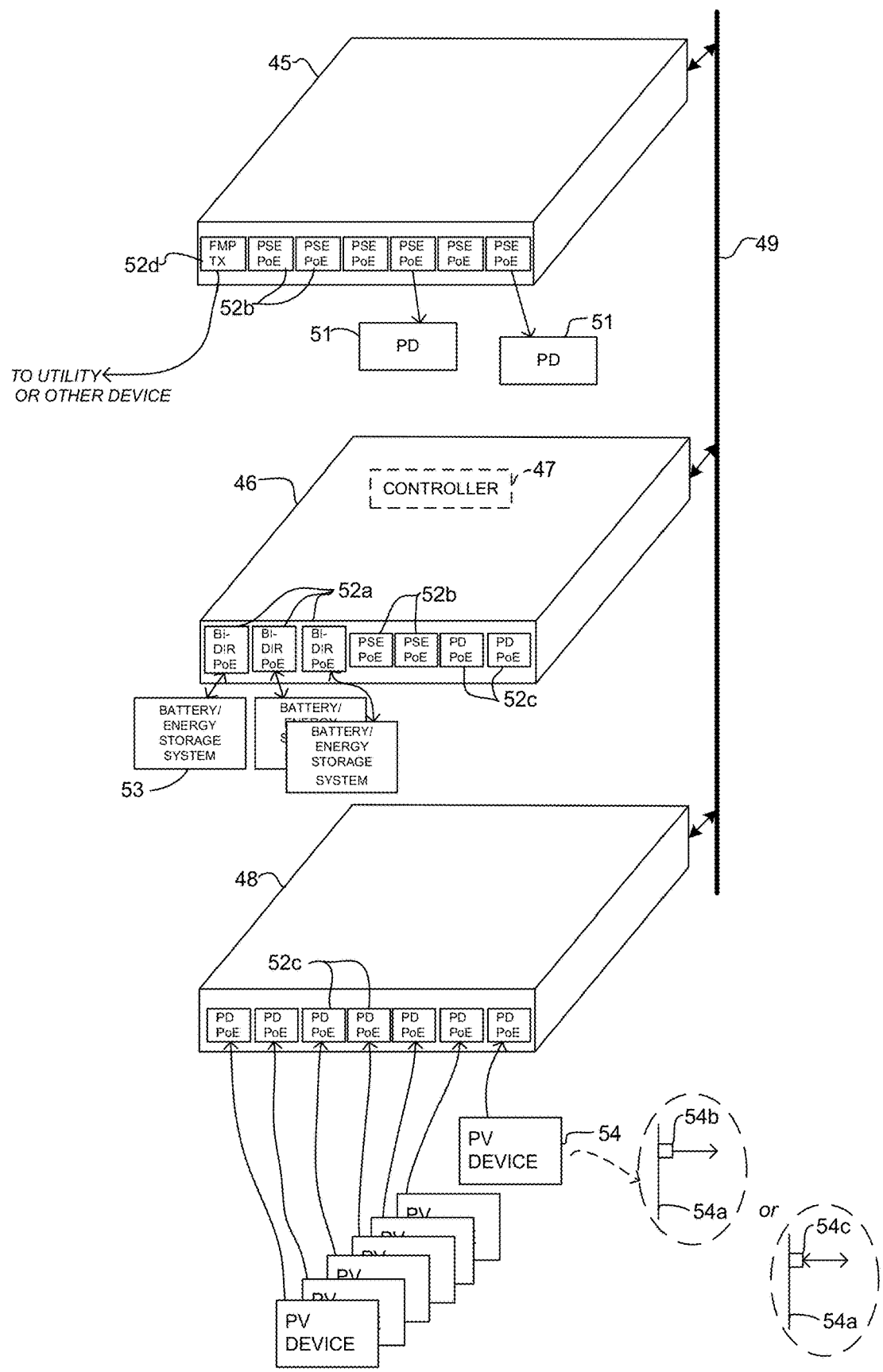
FIG. 4 illustrates the bi-directional PoE system with a plurality of switches coupled through a common shared power bus, in accordance with one embodiment.

FIG. 4 illustrates an example of a bi-directional PoE system comprising a plurality of network devices (e.g., switch, router, switch/router) 45, 46, 48 comprising a plurality of ports 52a, 52b, 52c, 52d, a power bus 49 connecting the network devices, with power shared between the network devices over the power bus, and a controller (system power controller) 47 for identifying available power and allocating power to the ports. In one or more embodiments, a system comprises a plurality of energy resource devices (e.g., battery/energy storage system 53, PV (photovoltaic) device 54), the network device 46, 48 comprising a plurality of PD PoE ports operable to receive power from the energy resource devices connected to the PD PoE ports, and the power bus 49 receiving power from the network device and coupled to at least one other network device 45 comprising a plurality of PSE PoE ports for transmitting power to powered devices 51.

In one example, the power bus 49 is configured for transmitting power in a voltage range of 54 VDC (Volts Direct Current) to 60 VDC. The power bus 49 may be configured to transmit PoE (power and data) at any suitable voltage level. As shown in the bi-directional PoE system of FIG. 4, the controller 47 is located at one of the network devices. The controller may also be located at a management device coupled to the power bus or may be a distributed control system located at one or more of the network devices. The plurality of ports comprise a plurality of PSE PoE ports 52b each operable to transmit power to a powered device 51 (e.g., lighting, IoT device, or other PD) connected to one of the PSE PoE ports, a plurality of PD PoE ports 52c each operable to receive power from a device 54 connected to one of the PD PoE ports, and a plurality of bi-directional PoE ports 52a, each configurable to operate as a PSE PoE port to transmit power to a device 53 (e.g., rechargeable battery, energy storage system, or other storage device) 53 connected to one of the bi-directional PoE ports or as a PD PoE port to receive power from the connected device. Each network device 45, 46, 48 may include only one type of port (e.g., only PD ports, only PSE ports, or only bi-directional ports) or any combination of ports. The ports may support all twisted pair speed types.

In the example shown in FIG. 4, three network devices 45, 46, 48 are coupled together over the common shared power bus 49. A first network device 45 (top unit in FIG. 4) is shown with ports operating as (defined as) PSE ports (e.g., 90 W or other power level ports). In this example, the network device 45 includes an FMP TX port 52d, which may be used to transmit FMP to a device or transmit excess power back to utility.

A second network device 46 (middle device in FIG. 4) is configured with bi-directional PoE ports 52a, PSE PoE ports 52b, and PD PoE ports 52c. The bi-directional PoE ports 52a are shown coupled to the battery or energy storage system 53.

A third network device 48 (bottom device in FIG. 4) is configured for micro-grid input and comprises a plurality of the PD PoE ports 52c. The third network device 48 may comprise, for example, a low power switch configured to pass basic commands, data, and other information to a primary network device (e.g., network device 46 coupled to the bus 49). In this example, the third network device 48 has a plurality of PV devices 54 (e.g., thin solar panel or film with connected electronics) coupled to the PD PoE ports 52c for transmitting power to the network device 48. The network device 48 may be referred to as a PD aggregator and may combine power received from the energy resource devices 54 at the PD PoE ports 52c and transfer the combined power over the power bus 49 to another network device (e.g., network device 45) comprising the PSE PoE ports 52b.

A side view of the PV device 54 is shown in FIG. 4. The PV device may include, a thin solar panel or film 54a (e.g., transparent, semi-transparent, opaque, or sun blocking) configured for mounting on a window, or any other device comprising photovoltaic cells operable to convert light into electricity. The solar panel 54a may be connected to a PoE device comprising a PSE port 54b or a bi-directional PoE port 54c. For example, a solar window blind may receive power for use in rolling up or down the window blind and transmit power generated when the sun is out to the network device 48. Thus, one or more of the PD PoE ports 52c may be configured as a bi-directional PoE port 52a operable to transmit power to the PV device 54 or receive power from the PV device.

It is to be understood that the system shown in FIG. 4 is only an example and the bi-directional PoE system may include any number of network devices (e.g., switches, routers, switch/routers) comprising any number, type, or combination of ports (PD PoE, PSE PoE, bi-directional PoE, FMP TX, FMP RX, FMP TX/RX) in any arrangement. One or more of the network devices 45, 46, 48 may receive utility power or FMP, as previously described with respect to FIG. 3. The network devices may be mounted in a rack, cabinet, or ceiling, for example.

Figure 5:
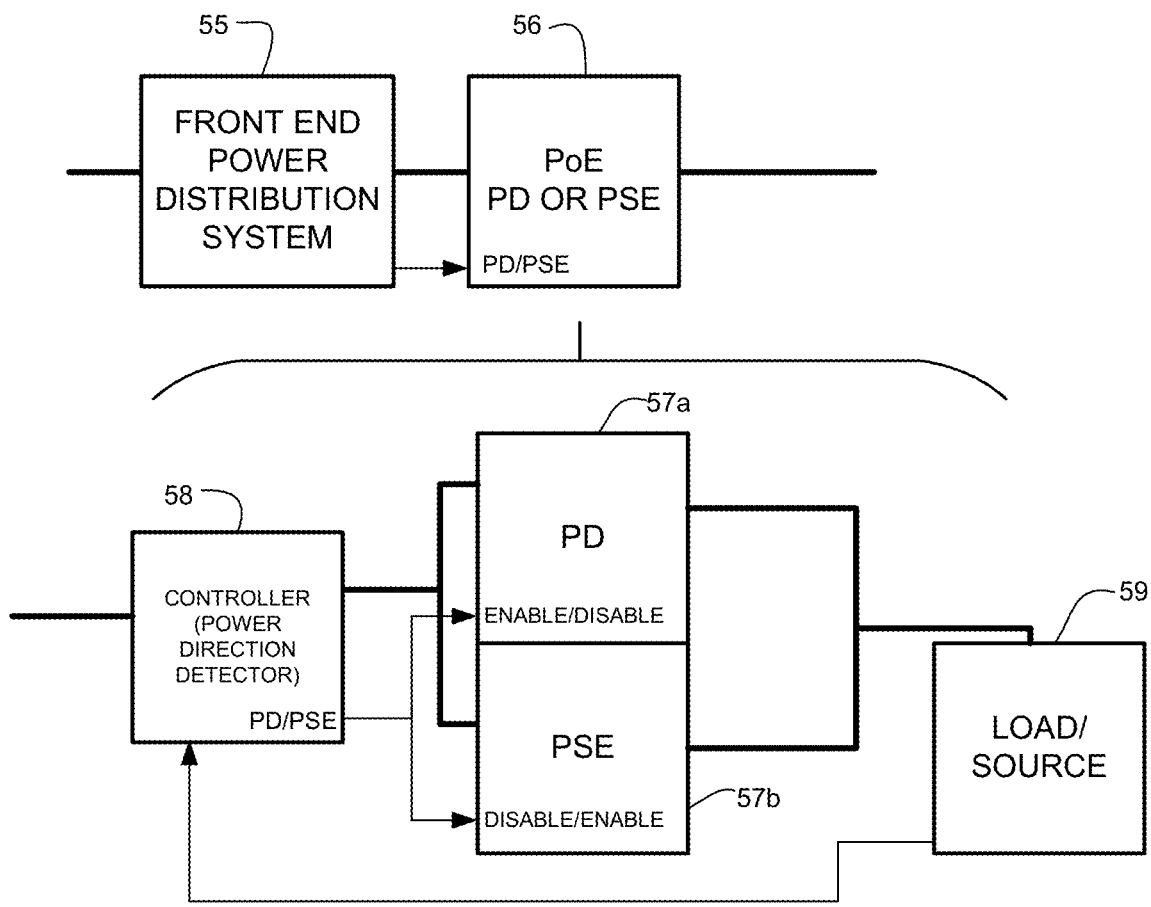
FIG. 5 is a block diagram of a directional power control system of the bi-directional PoE system, in accordance with one embodiment.

FIG. 5 is a simplified block diagram illustrating an overview of bi-directional PoE operation, in accordance with one embodiment. A front end power distribution system 55 provides power to one or more bi-directional PoE ports 56. Each port comprises a PD circuit 57a and a PSE circuit 57b coupled to a controller 58 operable to detect power direction and enable PD or PSE operation. The controller 58 transmits an enable (EN) signal to enable PD operation at PD circuit 57a or PSE operation at PSE circuit 57b. The port will transmit power to a load or receive power from a source (load/source 59). In one or more embodiments, the system incorporates a PD block 57a and a PSE block 57b with FET (Field Effect Transistor) bridging (described below with respect to FIGS. 10 and 11) to enable a negotiated direction of power (transmitting or receiving). An enable pin may be provided in a controller chip along with a state diagram set identifying basic PoE PSE and PD direction specific negotiations.

Figure 6:
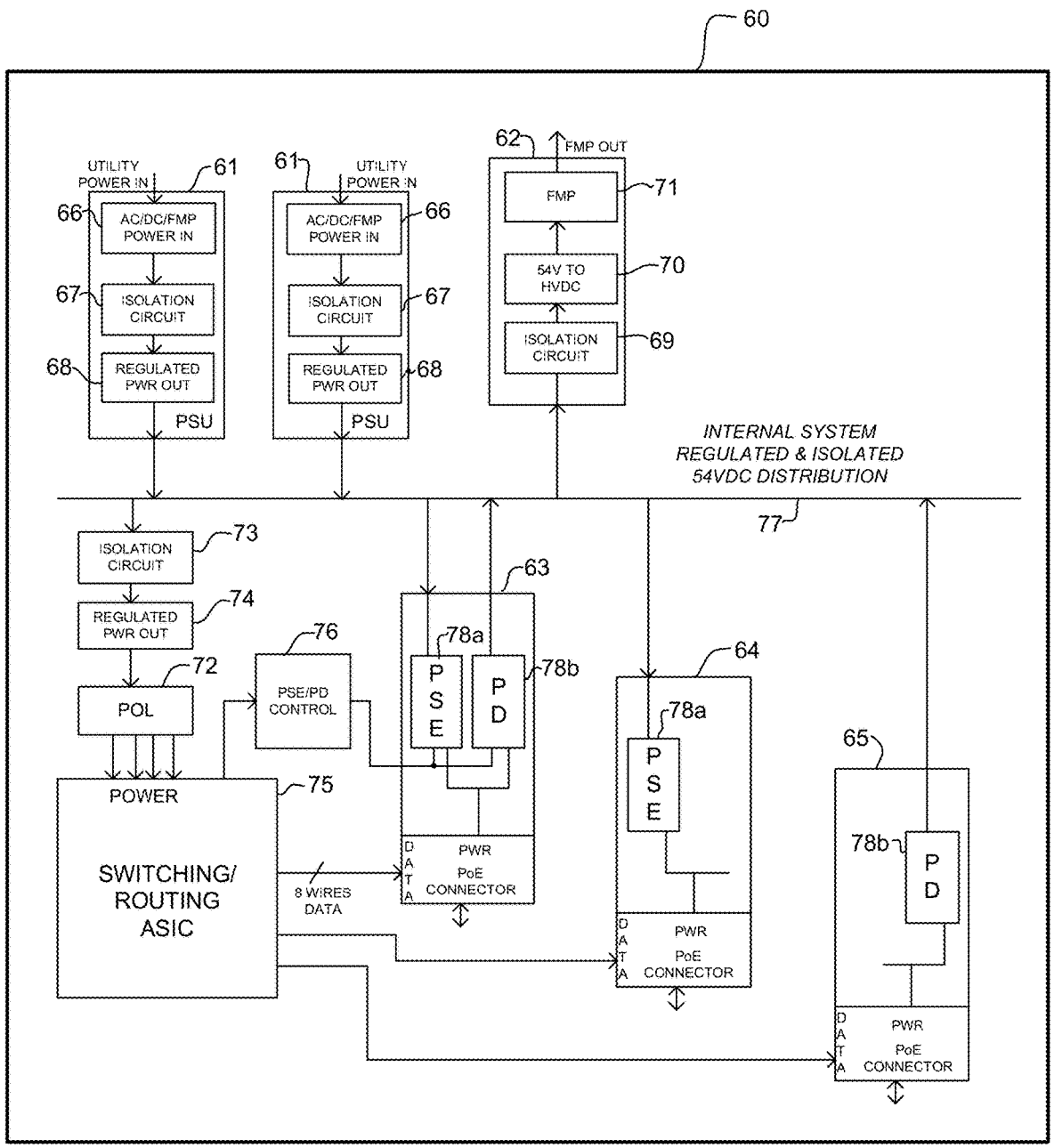
FIG. 6 is a block diagram of a bi-directional PoE switch, in accordance with one embodiment.

FIG. 6 is a block diagram of a bi-directional PoE network device 60 (e.g., switch or other network device), in accordance with one embodiment. In this example, two PSUs (Power Supply Units) 61 and an FMP unit 62 are coupled to a bi-directional PoE port 63, which supports PSE or PD operation, a PSE PoE port 64, and a PD PoE port 65. The PSU 61 may receive utility power or PSU input power from the FMP module (power adapter) 43 described above with respect to FIG. 3. In this example, the components (ports 63, 64, 65, PSU 61 and FMP unit 62) are coupled to an internal system 77 providing regulated and isolated 54 VDC distribution (or any voltage up to 60 VDC), for example. The PSUs 61 receive utility power (e.g., AC, DC, or FMP input) at block 66, which passes through isolation circuit 67 to provide regulated output power at block 68. The FMP unit 62 receives power from an isolation circuit 69, which is transmitted to a power converter operable to convert 54 VDC (or other regulated power) to HVDC (high voltage DC) at block 70. FMP is transmitted at block 71.

The network device 60 includes a POL (Point-of-Load) 72 coupled to the internal system 77 via an isolation circuit 73 and regulated power block 74. The POL 72 provides power over multiple rails to one or more integrated circuits (e.g., switching/routing ASIC (Application Specific Integrated Circuit) 75). The ASIC 75 is coupled to the bi-directional PoE port 63 through a PSE/PD power controller 76 operable to enable PSE or PD operation, as previously described with respect to FIG. 5. The ports 63, 64, 65 receive regulated and isolated power from the internal power distribution system and data from the ASIC 75. As previously noted, the network device 60 may include any number or combination of bi-directional, PD, PSE, or FMP ports. Each PoE port comprises a PoE connector (e.g., RJ-45 or other suitable connector) for transmitting PoE (bi-directional PoE port 63, PSE PoE port 64) or receiving PoE (bi-directional PoE port 63, PD port 65). Each port also comprises a PSE circuit 78a, PD circuit 78b, or both PSE and PD circuits.

Figure 7:
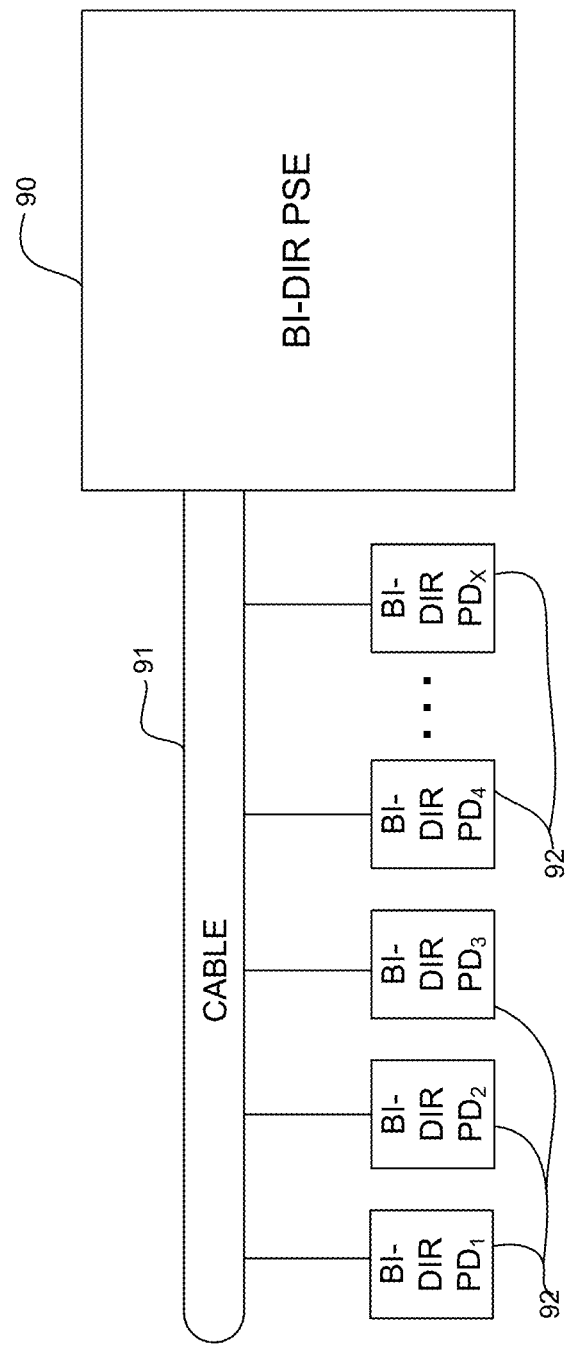
FIG. 7 is a block diagram illustrating single pair multi-drop bi-directional PoE, in accordance with one embodiment.

FIG. 7 illustrates an example of a single pair multi-drop (SPMD) bi-directional system, in accordance with one embodiment. In this example, a PSE port 90 transmits power and data over a cable 91 to a plurality of powered devices 92 ($PD_1$, $PD_2$, $PD_3$, $PD_4$, . . . $PD_x$). SPMD provides PSE simplification as voltage regulation is done at the PD. Power per segment may be more restricted due to a larger current on the single wire pair. The PSE port 90 and PDs 92 are configured for bi-directional PoE operation.

Figure 8:
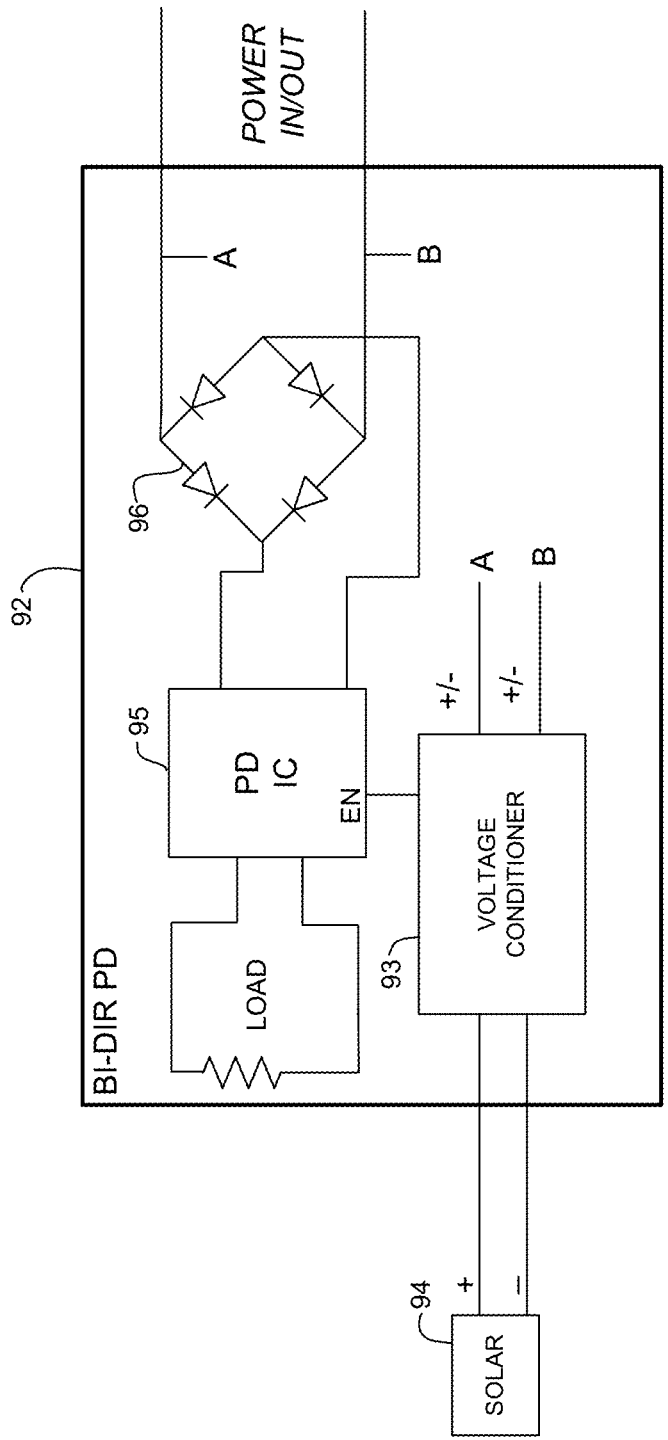
FIG. 8 is a block diagram of a powered device in FIG. 7, in accordance with one embodiment.

FIG. 8 is a simplified electrical schematic of the powered device 92, in accordance with one embodiment. In this example, a voltage conditioner 93 is coupled to a solar device 94 and senses polarity and adjusts as needed. A PD IC (Integrated Circuit) 95 is coupled to a load and a diode bridge 96. The voltage conditioner 93 may also sense voltage and regulate voltage at power in/out (A/B). The voltage conditioner 93 may include PSE functionality so that it can disable PD operation at the PD IC 95 to prevent self-discovery.

Figure 9:
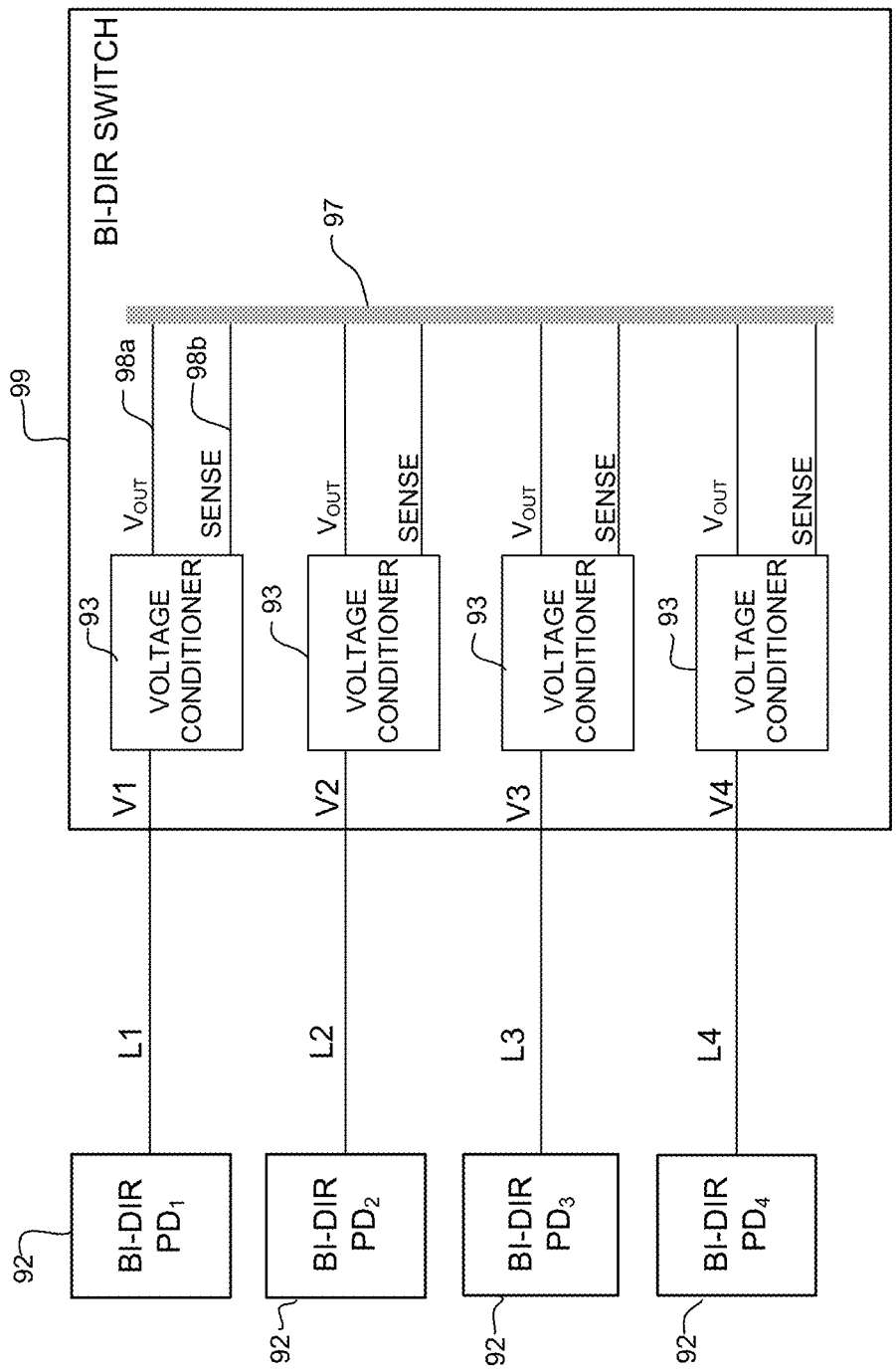
FIG. 9 is a block diagram illustrating voltage conditioners at bi-directional PoE ports of a switch, in accordance with one embodiment.

In order to account for different cable lengths connecting the bi-directional PoE ports to the connected devices, which will result in different voltages at the PSE (for reverse power system), voltage conditioner 93 is inserted into a switch 99 with bi-directional ports, as shown in FIG. 9. In this example, $V1 \neq V2 \neq V3 \neq V4$ due to the different cable lengths L1, L2, L3, and L4 connecting bi-directional PDs 92 ($PD_1$, $PD_2$, $PD_3$, $PD_4$), respectively to the switch. The voltage conditioners 93 are coupled to the internal system regulated and isolated distribution system 97 through voltage line (Vout) 98a and current sense line 98b.

Figure 10:
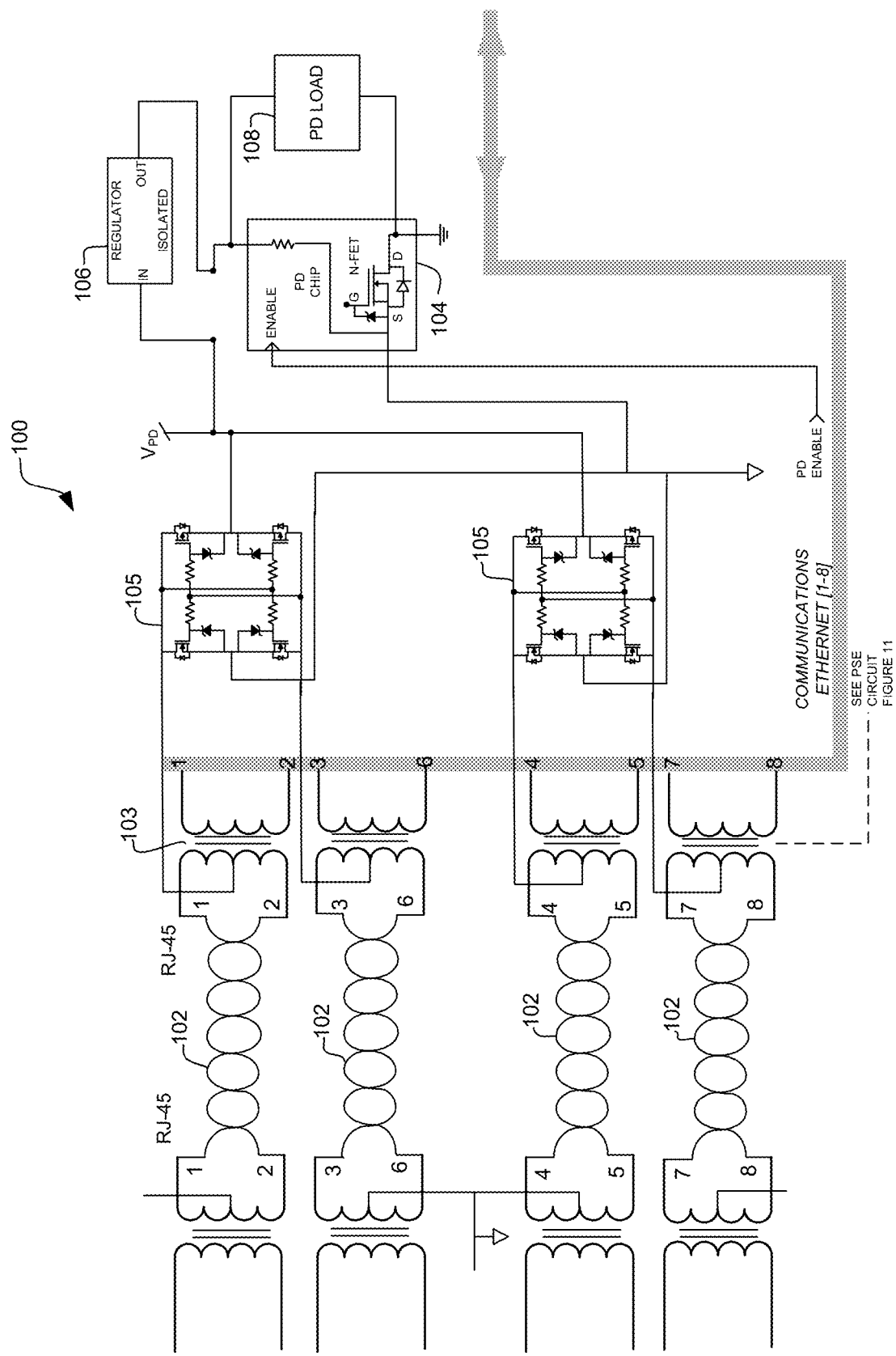
FIG. 10 is an electrical schematic of a powered device (PD) circuit for the bi-directional PoE port, in accordance with one embodiment.
Figure 11:
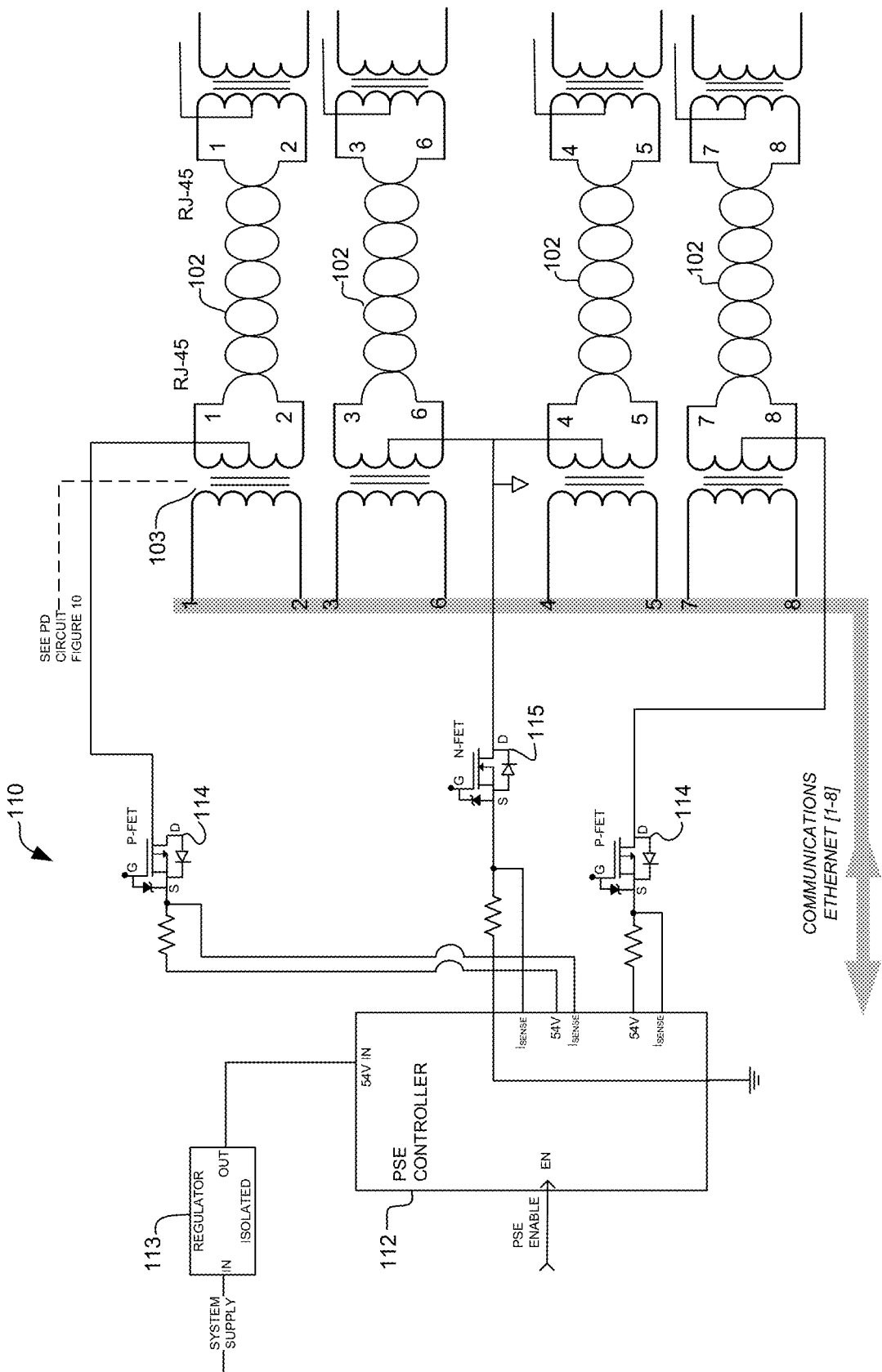
FIG. 11 is an electrical schematic of a power sourcing equipment (PSE) circuit for the bi-directional PoE port, in accordance with one embodiment.

FIGS. 10 and 11 illustrate PD and PSE circuits for the bi-directional PoE port, in accordance with one embodiment. For simplification and clarity, the circuits are shown separately in FIGS. 10 and 11, however, it is to be understood that that the PD and PSE circuits are both located at the bi-directional PoE port and are connected to the same set of transformers 103 coupled to the twisted pairs 102 of the cable.

FIG. 10 is an electrical schematic of a PD circuit for bi-directional PoE, generally indicated at 100. In this example, a connector (e.g., RJ-45 connector) is coupled to a cable comprising four twisted pairs 102. The PD circuit 100 includes two bridge rectifiers 105 coupled to a PD chip (PD IC) 104 comprising an N-FET. The PD chip 104 is coupled to a PD load 108 and PD operation is enabled at the PD chip with a PD enable signal. The PD chip 104 provides detection, presents classification, and controls the hot swap FET. The circuit also includes a regulator 106.

FIG. 11 is an electrical schematic of a PSE circuit for bi-directional PoE, generally indicated at 110. PSE enable is provided by a control signal at a PSE controller 112. In one or more embodiments, an enable signal is used to avoid problems with combining both PD and PSE to the same eight pins in which case the PSE may self-detect. The circuit 110 includes two P-FETs 114 and an N-FET 115.

The port includes center-tap transformers 103 that operate in a phantom power mode to either separate data from power when combined data and power are received (for PD operation shown in FIG. 10) or combine data with power and then transmit the combined data and power (for PSE operation shown in FIG. 11). Combined data and power is carried over the twisted pair conductors 102 in the Ethernet cable. The PoE power is carried bi-directionally on the same connector and pins at the port and along the same pairs of twisted wires in the cable.

Figure 12:
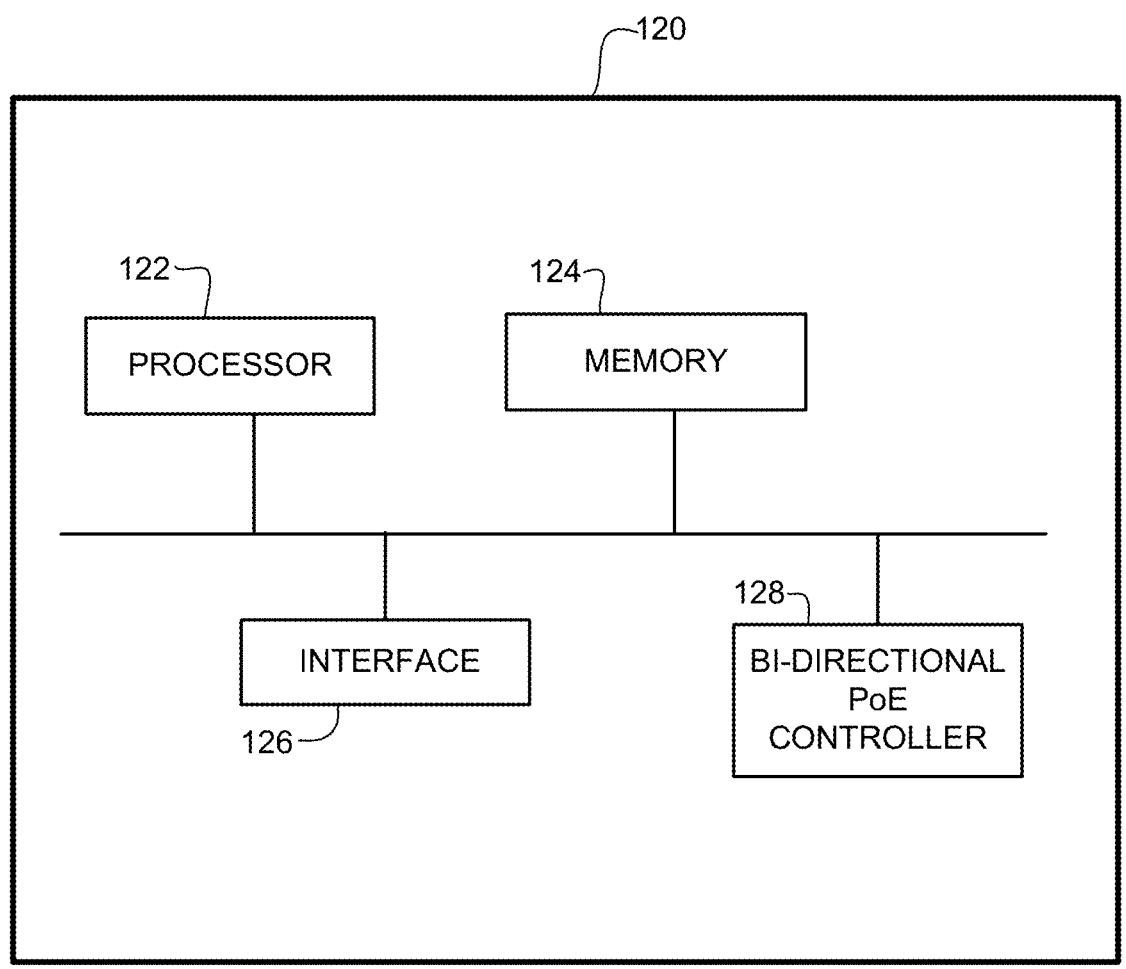
FIG. 12 is a block diagram depicting an example of a network device in which the embodiments described herein may be implemented.

FIG. 12 illustrates an example of a network device 120 (e.g., switch, router, and the like) that may implement one or more embodiments described herein. In one or more embodiments, the network device 120 is a programmable machine that may be implemented in hardware, software, or any combination thereof. The network device 120 includes one or more processor 122, memory 124, interface 126, and bi-directional PoE controller (power controller) 128.

Memory 124 may be a volatile memory or non-volatile storage, which stores various applications, operating systems, modules, and data for execution and use by the processor 122. The network device 120 may include any number of memory components.

Logic may be encoded in one or more tangible media for execution by the processor 122. For example, the processor 122 may execute codes stored in a computer-readable medium such as memory. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. In one or more embodiments, logic may be encoded on one or more non-transitory computer readable media for execution and when executed operable to perform the steps described below with respect to FIGS. 13, 14, and 20. The logic may be in the form of software executed by the processor, digital signal processor instructions, or in the form of fixed logic in an integrated circuit, for example. The network device 120 may include any number of processors 122.

The network interface 126 may comprise any number of interfaces (line cards, ports, bi-directional PoE ports, PD ports, PSE ports) for receiving power and data or transmitting power and data to other network devices.

The bi-directional PoE controller 128 may be used to detect power direction, negotiate PoE, and enable PD or PSE operation, for example. The controller 128 may also perform PSE operations including, for example, PD detection and classification when the port is configured to operate as a PSE port or perform PD operations including, for example, presenting to the PSE valid detection and classification signatures in response to the PSE operations. The controller 128 may selectively activate (enable) the PD circuit shown in FIG. 10 or the PSE circuit shown in FIG. 11. The controller 128 may also monitor local power related parameters, current flows, or telemetry information, track power flow direction, and initiate a role reversal at the bi-directional PoE port. The power flow direction may be changed, for example, if excess power availability is identified at the PD.

It is to be understood that the network device 120 shown in FIG. 12 and described above is only an example and that different configurations of network devices may be used. For example, the network device may further include any suitable combination of hardware, software, algorithms, processors, devices, components, or elements operable to facilitate the capabilities described herein.

Figure 13:
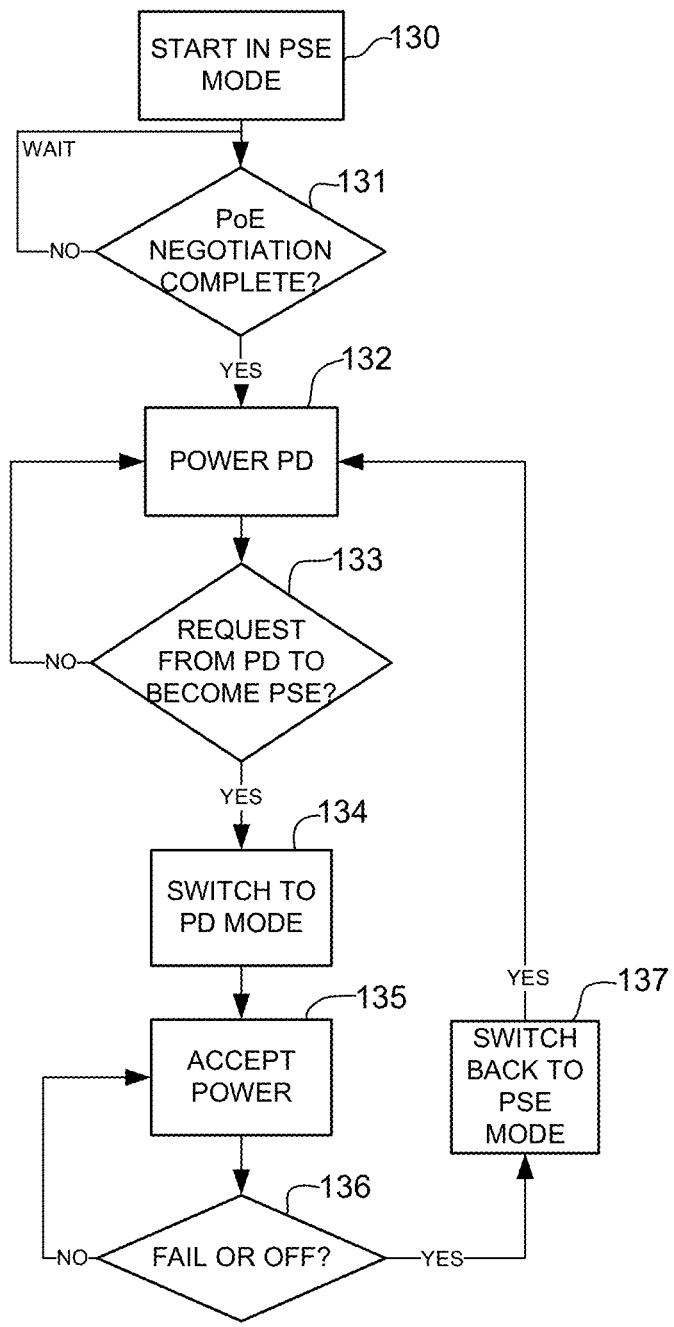
FIG. 13 is a flowchart illustrating a process for role reversal from PSE to PD, in accordance with one embodiment.
Figure 14:
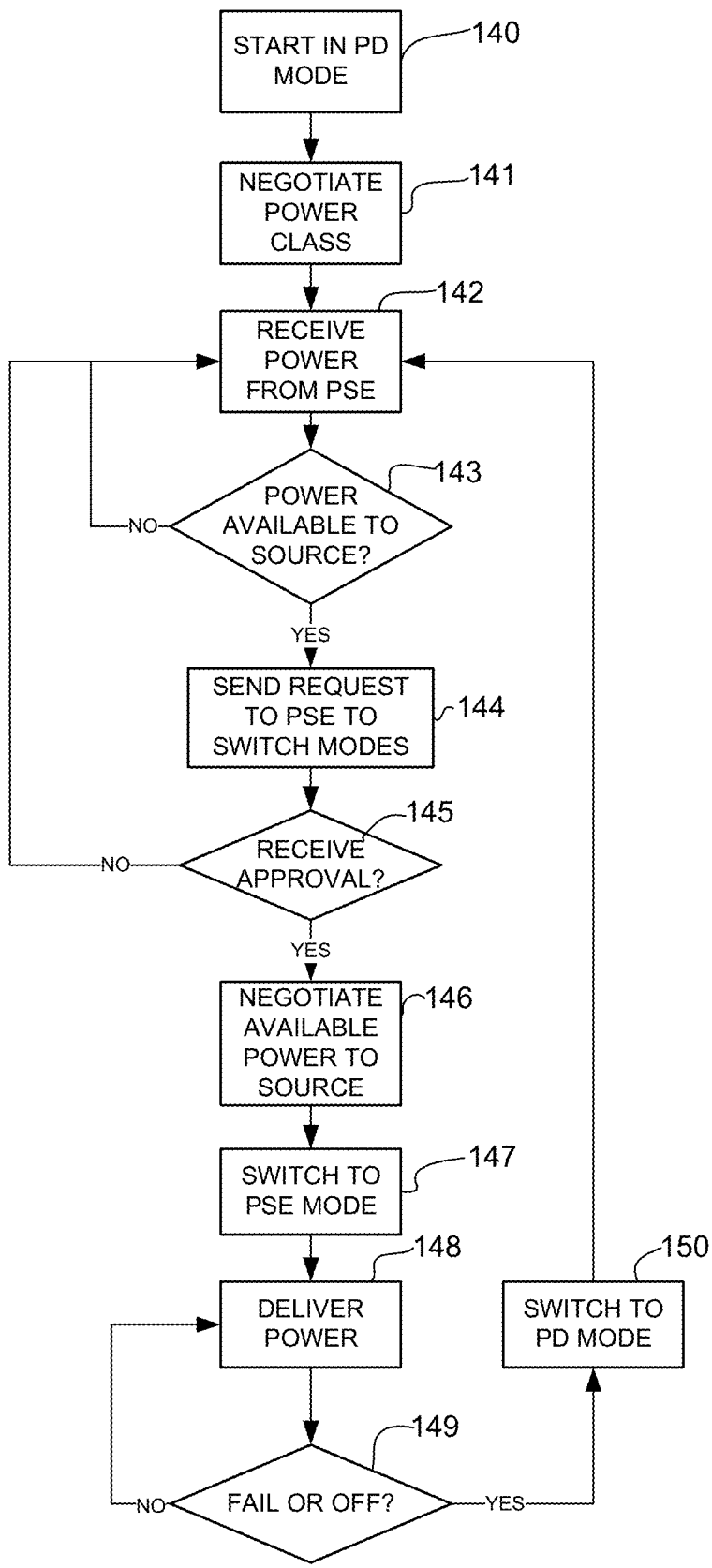
FIG. 14 is a flowchart illustrating a process for role reversal from PD to PSE, in accordance with one embodiment.

As previously described, the bi-directional PoE ports perform dynamic switching between PSE and PD roles of the ports at opposite ends of a cable so that power can flow bi-directionally. FIGS. 13 and 14 are flowcharts illustrating an overview of a process for PSE/PD and PD/PSE role reversal, in accordance with one embodiment. FIG. 13 describes a process in which the network device port starts out as a PSE (PSE mode) and switches to PD mode. FIG. 14 describes a process in which the network device port starts out as a PD (PD mode) and switches to PSE mode.

Referring first to FIG. 13, the bi-directional PoE port starts in PSE mode at step 130. The system waits for PoE standard negotiation at step 131 and once PoE negotiation is complete, the PSE powers the PD (step 132). If the PSE receives a request from the connected PD to become a PSE (step 133), the PSE will switch from a source (PSE mode) to a sink (PD mode) (step 134) and accept power (step 135) from the connected device, which is now operating as a PSE. If there is a failure or the connected device is no longer providing sufficient power (step 136), the device switches back to PSE mode (step 137) and powers the PD (step 132).

Referring now to FIG. 14, the bi-directional PoE port starts in PD mode (step 140). The port negotiates a power class (step 141) and receives power from the PSE (step 142). If power is available to source at the device (step 143), the PD may send a request to the PSE to switch modes (step 144). Upon receiving approval to switch modes (step 145), the device negotiates available power to source and a power source class (e.g., 15 W, 30 W, 45 W, 60 W, 90 W, 150 W, 200 W, 350 W, or any other suitable power level) (step 146). The device switches from PD mode to PSE mode (step 147) and delivers power to the connected device (step 148). If there is a failure or the device no longer has available power to source (or available power drops off) (step 149), the device switches back to PD mode (step 150) and receives power from the PSE (step 142).

It is to be understood that the processes shown in FIGS. 13 and 14 are only examples and steps may be added, deleted, modified, reordered, or combined, without departing from the scope of the embodiments.

Figure 15:
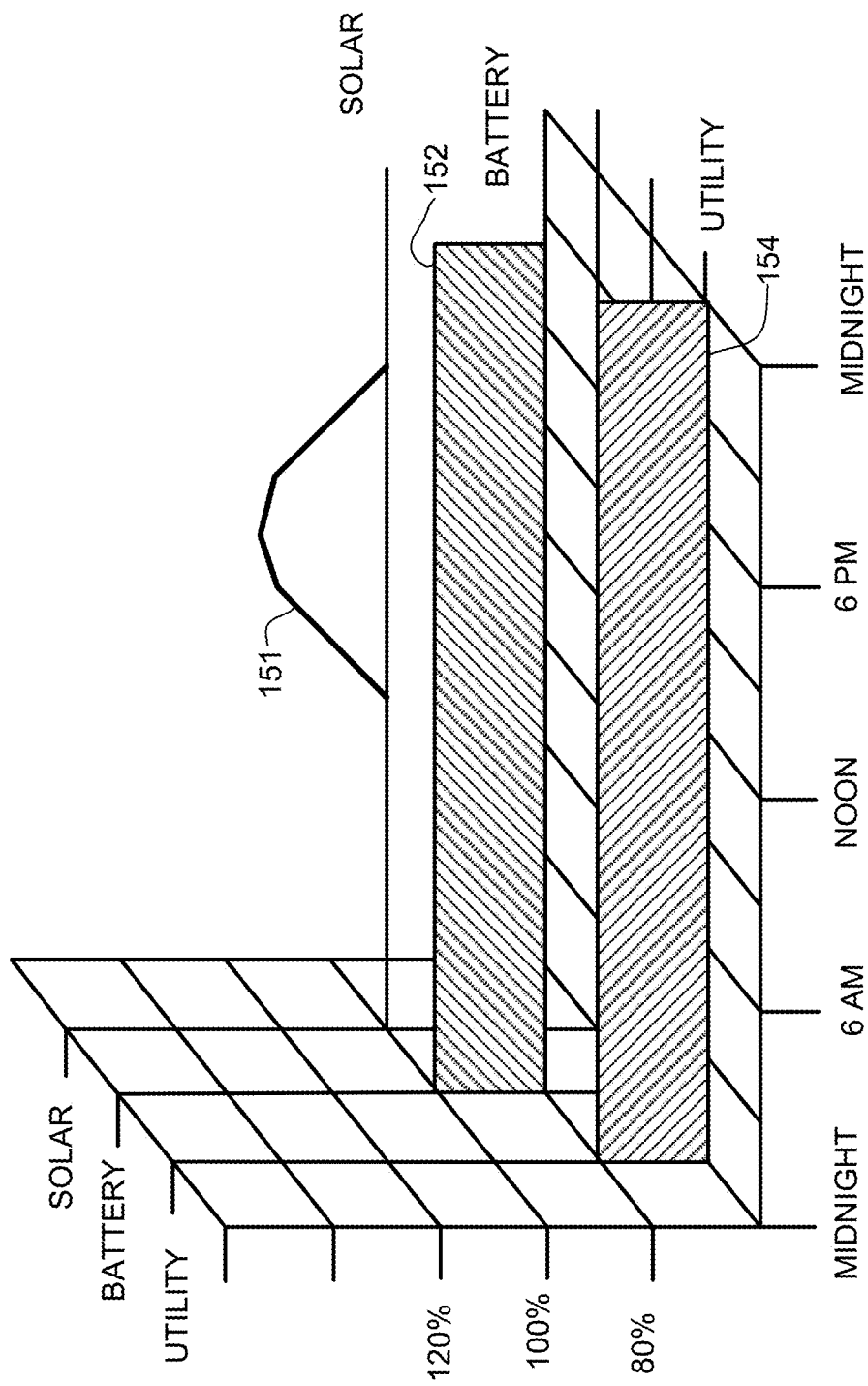
FIG. 15 is a power profile graph illustrating available power from solar, battery, and utility power sources over time.

FIG. 15 illustrates power management in a bi-directional PoE system operable to receive power from utility power, solar energy, or battery energy. In a graph shown in FIG. 15, solar power varies throughout the day as illustrated at trace 151. In this example, utility power provides 80% of available power, as shown at 154, and battery power provides the remaining 20% of available power, as shown at 152. It is to be understood that the power sources described in FIGS. 15-19 are only examples and additional power sources or different power sources may be used, without departing from the scope of the embodiments. Based on the available power and the number of active ports (active PSE ports), the ports may shed power, limit power, or add power to the system. In one or more embodiments, power may be shared among ports using an isolated distribution bus, as previously described.

Figure 16:
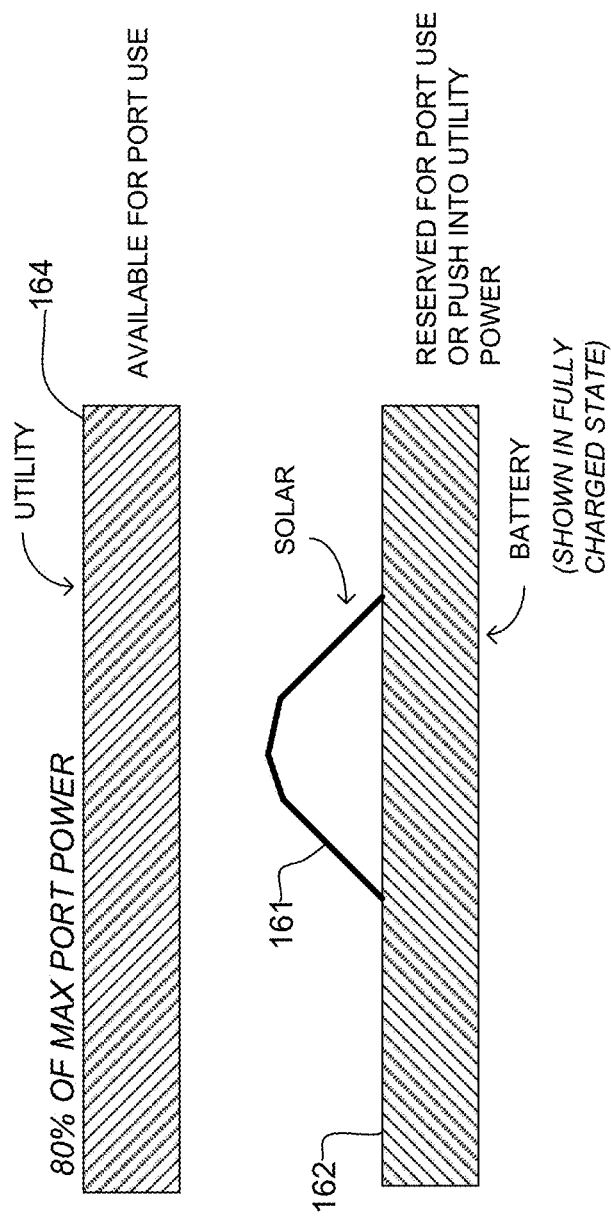
FIG. 16 illustrates an example in which utility power is available for port use with battery and solar power reserved for port use or to push into utility power.
Figure 17:
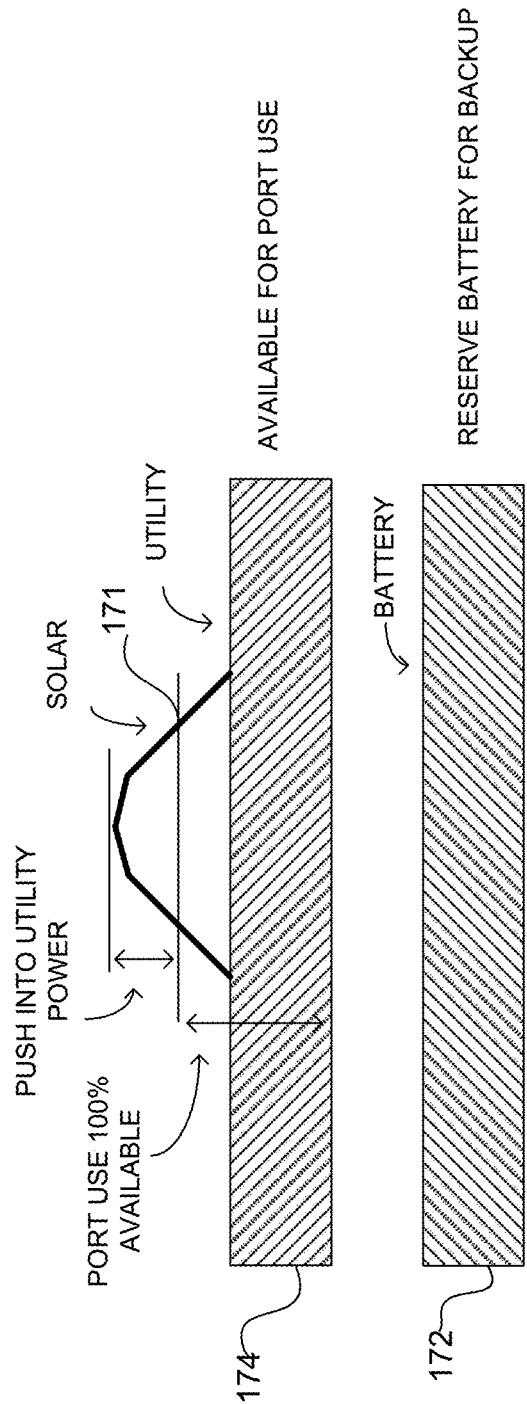
FIG. 17 illustrates an example in which utility and solar power are available for port use and the battery power is reserved for backup.
Figure 18:
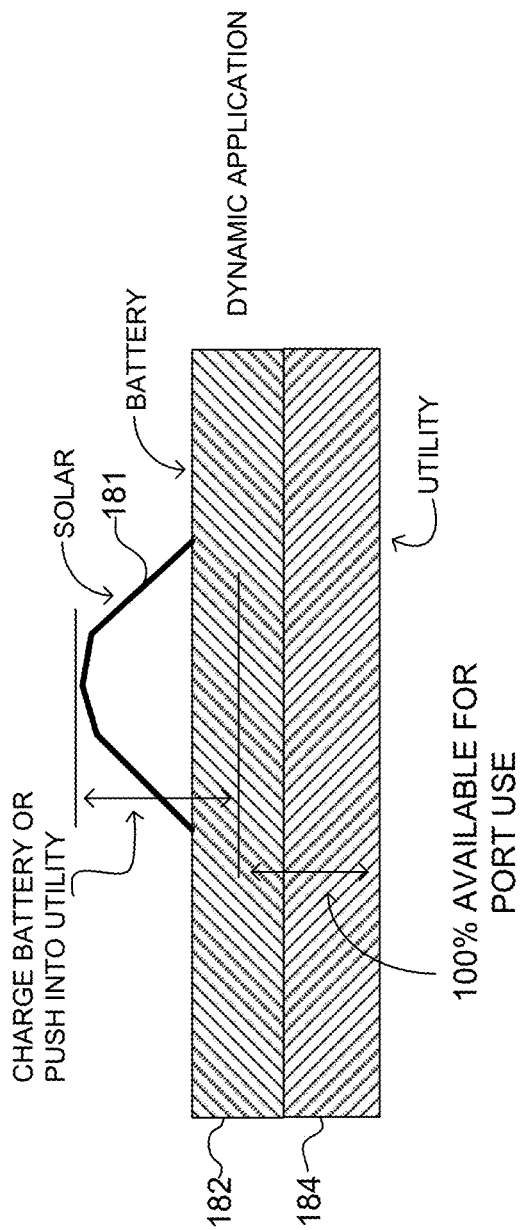
FIG. 18 illustrates an example of dynamic application of the utility, solar, and battery power.

FIGS. 16-18 illustrate different examples of power availability and usage. In a first example, shown in FIG. 16, utility power provides 80% of the maximum port power as indicated at 164. The available battery power shown at 162 is based on a battery in fully charged state. The solar power 161 and battery power 162 may be reserved for port usage or pushed into utility power.

In a second example shown in FIG. 17, battery power 172 is reserved for backup. 100% power is available for port use for at least part of the day using a combination of utility power 174 and solar power 171. When the solar power exceeds the needed power, the extra power may be pushed into utility. When the solar power drops off, power may be reduced at one or more ports.

In a third example shown in FIG. 18, 100% of power is available from utility 184 and battery 182 and may be dynamically applied. Extra solar power 181 at peak solar time may be used to charge the battery or pushed into utility power.

Figure 19:
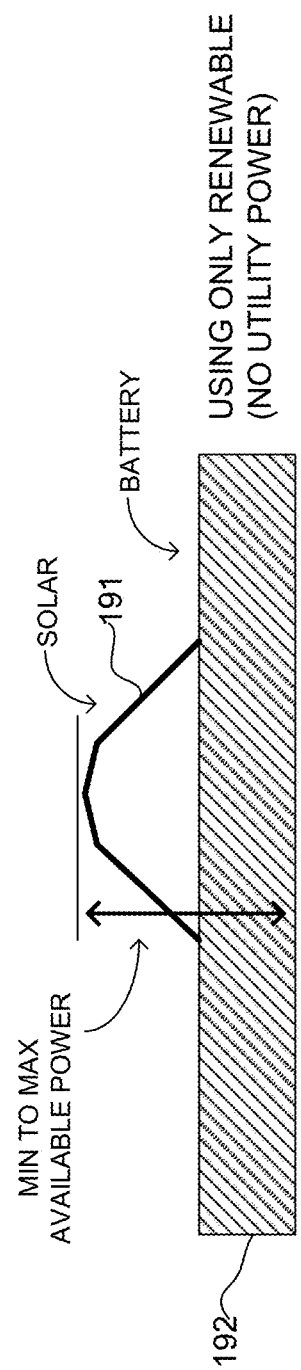
FIG. 19 illustrates an example using only solar and battery power.

In a fourth example shown in FIG. 19, only solar power 191 and battery power 192 are used, with no utility power. Power may need to be reduced at one or more ports when available power is less than 100%.

Various algorithms may be implemented to determine how to use available power and how to allocate power to the active ports. The system may be configured to shed power (turn off one or more ports, reduce power at one or more ports), limit power, reserve power, add excess power back to utility, or any combination thereof. The controller may use any type of algorithm (e.g., default, user defined) to determine how to allocate available power to active ports. The controller may take into account the time of day, weather conditions (cloudy, sunny), battery charge status, priority of one or more network devices or ports, or any other parameters or variables in allocating power to the active ports. Connected devices may collect data that provides information such as energy usage or building occupancy, which may be used in system analytics. The system may also include smart services with analytics (e.g., IoT enabled smart control applications at endpoint devices) with any number of sensors or type of monitoring. The power controller may communicate with one or more devices using any suitable power management communication protocol, including for example, LLDP (Link Layer Data Protocol), which may also be used to signal role reversal of the bi-directional PoE ports.

Figure 20:
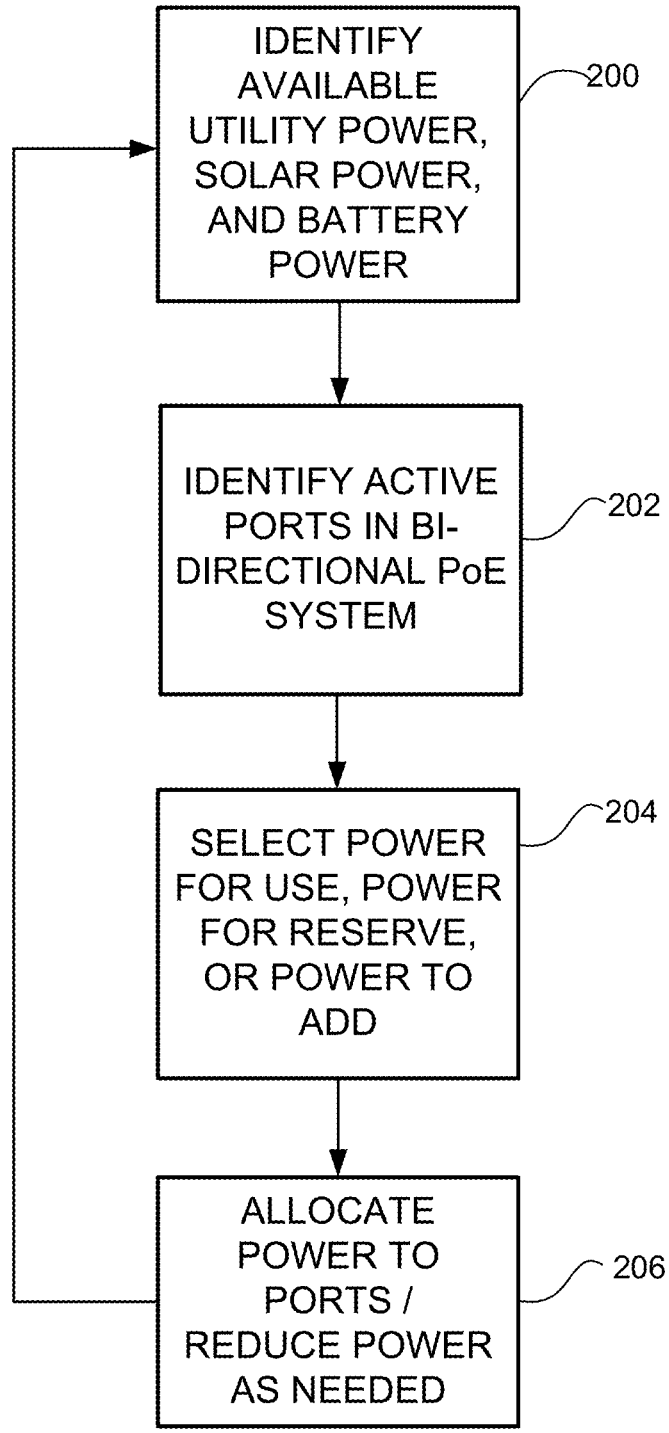
FIG. 20 is a flowchart illustrating an overview of a process for identifying available power and allocating power, in accordance with one embodiment.

FIG. 20 illustrates an overview of a process in which available utility power, solar power, and battery power is identified and allocated for any number of ports. Power allocation may be based on any number of parameters including, time of day, power availability, port priorities, etc. Available power from a plurality of power sources comprising a utility power source, a solar power source, and a battery power source is identified at step 200. Active ports in the bi-directional PoE system are identified (e.g., PSE ports or bi-directional ports operating as PSE) (step 202). A portion (0-100%) of each power source may be selected to power the ports or for another use (e.g., extra solar power pushed into utility power, extra power used to charge battery) (step 204). A controller allocates power from one or more of the power sources to power the active ports (step 206). Power may be reduced at one or more ports if available power is less than needed at all ports operating at full capacity. This may include turning off one or more ports or limiting power at one or more ports. This process may be continually updated as power levels change (e.g., available solar power varies throughout the day or changing weather conditions, battery charged) and adjusted to meet varying needs at the ports. For example, one or more powered devices may have available power to put back into the bi-directional PoE system, thereby reducing system power needs. The power identification and allocation may be updated periodically or upon sensing a change in power usage or availability.

It is to be understood that the process shown in FIG. 20 is only an example and steps may be modified or added without departing from the scope of the embodiments. Also, any combination of power sources may be used (e.g., utility, battery, solar, wind) to power any number or type of ports.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A system comprising:
   a plurality of network devices comprising a plurality of ports;
   a common shared power bus connecting said plurality of network devices, wherein power is shared between said plurality of network devices over the common shared power bus; and
   a controller for identifying available power and allocating power to said plurality of ports;
   wherein said plurality of ports comprises:
      a plurality of PSE (Power Sourcing Equipment) PoE (Power over Ethernet) ports each operable to transmit power to a device connected to one of the PSE PoE ports;
      a plurality of PD (Powered Device) PoE ports each operable to receive power from a device connected to one of the PD PoE ports; and
      a plurality of bi-directional PoE ports each configurable to operate as a PSE PoE port to transmit power to a device connected to one of the bi-directional PoE ports or as a PD PoE port to receive power from the connected device.

2. The system of claim 1 wherein the device connected to one of the bi-directional PoE ports comprises a solar device.

3. The system of claim 1 wherein the device connected to one of the bi-directional PoE ports comprises a rechargeable battery.

4. The system of claim 1 wherein a plurality of photovoltaic devices are connected to a group of the PD PoE ports.

5. The system of claim 1, wherein the controller is located at one of the plurality of network devices and is a system power controller that identifies available power in the system and allocates the available power to the plurality of ports of the plurality of network devices.

6. The system of claim 1, wherein at least one of the network devices receives utility power, the device connected to one of the bi-directional PoE ports comprises a rechargeable battery, and the device connected to one of the PD PoE ports or one of the bi-directional PoE ports comprises a solar device, and wherein the controller is configured to identify available utility power, available battery power, and available solar power and determine a portion of each of the available utility power, the available battery power, and the available solar power to use for powering the plurality of ports.

7. The system of claim 1, wherein said plurality of ports further comprises a fault managed power port configured to transmit fault managed power to one of the network devices.

8. The system of claim 7, wherein the fault managed power port is further configured to transmit excess power back into a utility power source.

9. The system of claim 1, wherein the common shared power bus couples together the plurality of network devices and is configured for transmitting power in a voltage range of 54 VDC (Volts Direct Current) to 60 VDC.

10. An apparatus comprising:
a plurality of bi-directional PoE (Power over Ethernet) ports each configurable to operate as a PSE (Power Sourcing Equipment) PoE port to transmit power to a device connected to one of the bi-directional PoE ports or as a PD (Powered Device) PoE port to receive power from the device;
a power supply unit; and
a fault managed power module having a fault managed power port for receiving fault managed power on an Ethernet cable, converting the fault managed power to a power supply input power, and transmitting the power supply input power to the power supply unit, wherein the fault managed power module is aligned for connection with the power supply unit.

11. The apparatus of claim 10, wherein the fault managed power comprises DC (Direct Current) pulse power and wherein the power supply unit is a removable module configured to provide the power supply input power to the apparatus and wherein the power supply input power is provided by the fault managed power module to the power supply unit.

12. The apparatus of claim 10 further comprising at least one PD PoE port or PSE PoE port.

13. The apparatus of claim 10 wherein each of said plurality of bi-directional PoE ports comprises a PD circuit and a PSE circuit connected to a same set of transformers coupled to twisted pairs of an Ethernet cable, the PSE circuit comprising a PSE controller with an enable signal input for use in switching between PD and PSE operation.

14. The apparatus of claim 10 wherein the device connected to one of the bi-directional PoE ports comprises a solar device operable to receive power when the bi-directional PoE port operates as the PSE PoE port or transmit power when the bi-directional PoE port operates as the PD PoE port.

15. The apparatus of claim 10 wherein at least one of the bi-directional PoE ports is operable to transmit or receive power from a plurality of devices connected to the bi-directional PoE port on a single pair cable in a multi-drop arrangement.

16. The apparatus of claim 15 wherein each of said plurality of devices comprises a voltage conditioner.

17. The apparatus of claim 10 wherein each of said plurality of bi-directional PoE ports comprises a voltage conditioner to account for different cable lengths connecting the bi-directional PoE ports to the connected devices.

18. The apparatus of claim 10 wherein the device connected to one of the bi-directional PoE ports comprises a battery operable to receive power when the bi-directional PoE port operates as the PSE PoE port or transmit power when the bi-directional PoE port operates as the PD PoE port.

19. A method comprising:
identifying available power from a plurality of power sources comprising a utility power source, a solar power source, and a battery power source;
identifying active ports in a bi-directional Power over Ethernet (PoE) system; and
allocating power from one or more of said plurality of power sources to power the active ports by determining a portion to select of the plurality of power sources to power the active ports or to charge another one of the plurality of power sources.

20. The method of claim 19 wherein allocating power further comprises allocating power to charge the battery power source or add to the utility power source.

21. The method of claim 19 further comprising transmitting extra battery or solar power back into the utility power source.

22. The method of claim 19 further comprising reducing power at one or more of the active ports based on said available power.

23. The method of claim 22 wherein reducing power comprises turning off one or more of the active ports.

24. The method of claim 22 wherein reducing power comprises limiting power at one or more of the active ports.

25. The method of claim 19 further comprising reserving the battery power source for backup power.

26. A system comprising:
a plurality of energy resource devices;
a network device comprising a plurality of PD (Powered Device) PoE (Power over Ethernet) ports operable to receive power from the energy resource devices connected to the PD PoE ports; and
a common shared power bus for receiving power from the network device and transmitting power to at least one other network device comprising a plurality of PSE (Power Sourcing Equipment) PoE ports for transmitting power to powered devices.

27. The system of claim 26 wherein the PD PoE ports comprise bi-directional PoE ports operable to transmit power to the energy resource devices or receive power from the energy resource devices.

28. The system of claim 27 wherein the energy resource devices comprise one or more photovoltaic devices or rechargeable battery devices each operable to switch between a first mode configured to receive power from one of the bi-directional PoE ports and a second mode operable to transmit power to one of the bi-directional PoE ports.

29. The system of claim 26 wherein the energy resource devices comprise a plurality of flexible solar panels.

30. The system of claim 26 wherein the energy resource devices comprise a plurality of solar window blinds.

31. The system of claim 26 wherein the energy resource devices comprise semi-transparent solar films configured for mounting on windows.

32. The system of claim 26 wherein the network device comprises a powered device aggregator for combining power received at the PD PoE ports from the energy resource devices.

\* \* \* \* \*